(12) United States Patent
Levchuk et al.

(10) Patent No.: US 9,917,739 B2
(45) Date of Patent: Mar. 13, 2018

(54) SYSTEMS AND METHODS FOR NETWORK PATTERN MATCHING

(71) Applicant: Aptima, Inc., Woburn, MA (US)

(72) Inventors: Georgiy Levchuk, South Grafton, MA (US); E. Webb Stacy, Andover, MA (US); Charlotte Shabarekh, Arlington, MA (US)

(73) Assignee: Aptima, Inc., Woburn, MA (US)

( * ) Notice: Subject to any disclaimer, the term of this patent is extended or adjusted under 35 U.S.C. 154(b) by 84 days.

(21) Appl. No.: 14/379,503

(22) PCT Filed: Dec. 31, 2012

(86) PCT No.: PCT/US2012/072313
§ 371 (c)(1),
(2) Date: Aug. 19, 2014

(87) PCT Pub. No.: WO2013/126144
PCT Pub. Date: Aug. 29, 2013

(65) Prior Publication Data
US 2015/0049634 A1 Feb. 19, 2015

Related U.S. Application Data

(60) Provisional application No. 61/600,811, filed on Feb. 20, 2012.

(51) Int. Cl.
*H04L 12/24* (2006.01)
*G06Q 50/00* (2012.01)

(52) U.S. Cl.
CPC ............ *H04L 41/12* (2013.01); *G06Q 50/01* (2013.01); *H04L 41/14* (2013.01); *H04L 41/142* (2013.01)

(58) Field of Classification Search
CPC .................................................... H04L 41/12
See application file for complete search history.

(56) References Cited

U.S. PATENT DOCUMENTS

| 4,739,401 A | 4/1988 | Sacks et al. |
| 6,370,526 B1 | 4/2002 | Agrawal et al. |
| 6,581,048 B1 | 6/2003 | Werbos |

(Continued)

FOREIGN PATENT DOCUMENTS

WO 2013/126144 8/2013

OTHER PUBLICATIONS

Lee Dong Yun, International Search Report and Written Opinion for parent PCT App. No. PCT/US2012/072313, dated Aug. 27, 2013, 8 pages, Korean Intellectual Property Office, Republic of Korea.

(Continued)

*Primary Examiner* — John Blanton
(74) *Attorney, Agent, or Firm* — John J. Brooks, III

(57) ABSTRACT

Example embodiments of systems and methods for network pattern matching provide the ability to match hidden networks from noisy data sources using probabilistic multi-attribute graph matching analysis. The algorithms may map roles and patterns to observed entities. The outcome is a set of plausible network models. The pattern-matching methodology of these systems and methods may enable the solution of three challenges associated with social network analysis, namely network size and complexity, uncertain and incomplete data, and dynamic network structure.

20 Claims, 19 Drawing Sheets

(a) Model network (b) Data network (c) Example mismatch coefficients (d) Mapping nodes individually (e) Mapping using network structure

(56) References Cited

U.S. PATENT DOCUMENTS

| | | | |
|---|---|---|---|
| 6,691,171 B1 | 2/2004 | Liao | |
| 7,293,235 B1 | 11/2007 | Powers et al. | |
| 7,370,357 B2* | 5/2008 | Sekar | H04L 12/2602 709/224 |
| 7,542,949 B2 | 6/2009 | Wren et al. | |
| 7,702,685 B2 | 4/2010 | Shrufi et al. | |
| 8,289,884 B1* | 10/2012 | Fishman | 370/248 |
| 8,909,950 B1* | 12/2014 | Levchuk | H04W 52/0251 455/418 |
| 2002/0165842 A1 | 11/2002 | Hellerstein et al. | |
| 2004/0010783 A1 | 1/2004 | Moritz | |
| 2007/0005596 A1* | 1/2007 | Brown | G06F 17/30286 |
| 2007/0136788 A1* | 6/2007 | Monahan | H04L 63/20 726/3 |
| 2007/0183670 A1* | 8/2007 | Owechko | G06K 9/00369 382/224 |
| 2008/0126815 A1 | 5/2008 | Cantwell et al. | |
| 2009/0244291 A1 | 10/2009 | Saptharishi et al. | |
| 2010/0026470 A1 | 2/2010 | Wilson et al. | |
| 2010/0082798 A1 | 4/2010 | Bhogal et al. | |
| 2010/0142547 A1 | 6/2010 | Dai et al. | |
| 2010/0180215 A1 | 7/2010 | Bates et al. | |
| 2010/0185984 A1 | 7/2010 | Wright et al. | |
| 2010/0203876 A1 | 8/2010 | Krishnaswamy | |
| 2010/0241698 A1* | 9/2010 | Hillerbrand | H04L 12/24 709/203 |
| 2010/0287396 A1 | 11/2010 | Barth | |
| 2010/0332876 A1 | 12/2010 | Fields et al. | |
| 2011/0113015 A1 | 5/2011 | Cannon et al. | |
| 2012/0002733 A1* | 1/2012 | Misra | H04N 21/4516 375/259 |
| 2012/0005239 A1 | 1/2012 | Nevin, III | |
| 2013/0097138 A1* | 4/2013 | Barkol | G06F 17/30466 707/706 |

OTHER PUBLICATIONS

Description of Android Screebl application, as downloaded from the Internet on Apr. 18, 2011 from site "http://www.androidtapp.com/screebl/", 13 pgs.

Sharkey, Jeff, "Coding for Life-Battery Life, That Is", presented at Google I/O 2009, May 2009. Accessed online at http://www.scribd.com/doc/16917367/Coding-for-Life-Battery-Life-That-Is on Apr. 16, 2010. 32 pgs.

Mayo, R. & P. Ranganathan, "Energy Consumption in Mobile Devices: Why Future Systems Need Requirements-Aware Energy Scale-Down," HP Labs Technical Report HPL-2003-167, 15 pgs., 2003.

Levchuk, G.; Grande, D.; Pattipatti, K.; Levchuk, Y; & Kott, A., "Mission Plan Recognition: Developing Smart Automated Opposing Forces for Battlefield Simulations and Intelligence Analyses," Proceedings of the 13th International Command and Control Research and Technology Symposium, 42 pgs., 2008.

Vincent Wen-Liang Chang, Office Action for parent U.S. Appl. No. 13/088,607, filed Apr. 18, 2011, dated Nov. 4, 2013, 15 pgs., USPTO.

Vincent Wen-Liang Chang, Office Action for parent U.S. Appl. No. 13/088,607, filed Apr. 18, 2011, dated May 27, 2014, 15 pgs., USPTO.

Vincent Wen-Liang Chang, Office Action Detail for U.S. Appl. No. 14/557,435, filed Dec. 1, 2014, dated Aug. 3, 2016, 19 pgs., USPTO.

Georgiy M. Levchuk, John-Colonna Romano, Krishna Patipati, "Adaptive Automated Opposing Forces for Urban Operations Training", Interservice/Industry Trainig Simulations, and Education Conference (I/ITSEC), Nov. 2010, 9 pgs., Orlando FL, USA.

Georgiy M. Levchuk, Djuana Lea, Krishna R. Pattipati, "Recognition of Coordinated Adversarial Behaviors from Multi-Source Information", Sensors, and Command, Control, Communication, and Intelligence (C3I) Technologies for Homeland Security and Homeland Defense VII. Edited by Carapezza, Edward M., Proceedings of the SPEI, vol. 3943, Art. ID. 694305, 16 pgs. (2008).

Wanhyun Cho, Sunworl Kim, Gukdong Ahn, "Detection and recognition of moving objects using the temporal difference method and the hidden markov model" CSAE 2011 IEEE International Conference, vol. 4, pp. 119-123, 5 pgs., Jun. 2011.

Bryan Auslander, Stephen Lee-Urban, Chad Hogg and Hector Munoz-Avila, "Recognizing the Enemy: Combining Reinforcement learning with Strategy Selection using Case-Based Reasoning." ECCBR'08, 15 pgs, 2008.

Maj Grant S. Fawcett "Cultural Understandings in Counterinsurgency: Analysis of the Human Terrain System," School of Advanced Military Studies, United States Army Command and General Staff College, Fort Leavenworth, Kansas, 57 pgs, AY 2009.

Fuming Wu, Non-Final Office Action for U.S. Appl. No. 13/306,023, dated Jul. 31, 2013, USPTO, Alexandria VA, 10 pgs., USA.

Fuming Wu, Final Office Action for U.S. Appl. No. 13/306,023, dated Mar. 27, 2014, USPTO, Alexandria VA, 14 pgs., USA.

Fuming Wu, Non-Final Office Action for U.S. Appl. No. 13/306,023, dated Jul. 16, 2014, USPTO, Alexandria VA, 13 pgs., USA.

Fuming Wu, Final Office Action for U.S. Appl. No. 13/306,023, dated Mar. 9, 2015, USPTO, Alexandria VA, 15 pgs., USA.

Fuming Wu, Notice of Allowance for U.S. Appl. No. 13/306,023, dated Jun. 2, 2015, USPTO, Alexandria VA, 11 pgs., USA.

Gerald Tesauro, "Temporal Difference Learning and TD-Gammon," Communication of the ACM, vol. 38, No. 3, pp. 58-68, 11 pgs., Mar. 1995.

Valera et al., "Intelligent distributed surveillance systems: a review," IEE Proc.—Vis. Image Signal Process., vol. 152, No. 2 pp. 192-204, 13 pgs., Apr. 2005.

Nakamura, Yukari, PCT International Preliminary Report on Patentability, PCT/US2012/072313 filed Dec. 31, 2012, dated Sep. 4, 2014. 7 pgs., WIPO, Switzerland.

Chang, Vincent, Notice of Allowance for U.S. Appl. No. 13/088,607, filed Apr. 18, 2011, mailed Aug.5, 2014, USPTO. 5 pgs. , USA.

Nakamura, Yukari, PCT International Preliminary Report on Patentability for Parent Application No. PCT/US2012/072313 filed Dec. 31, 2012, dated Sep. 4, 2014. 7 pgs., WIPO, Switzerland.

Chang, Vincent, Notice of Allowance for U.S. Appl. No. 13/088,607, filed Apr. 18, 2011, dated Aug. 5, 2014, USPTO. 5 pgs. , USA.

Bryan Auslander, Stephen Lee-Urban, Chad Hogg and Hector Munoz-Avila, "Recognizing the Enemy: Combining Reinforcement learning with Strategy Selection using Case-Based Reasoning." ECCBR'08, 2008. 15 pgs., Germany.

* cited by examiner (a) Mapping produces multiple prediction alternatives (b) Computing prediction state attributes (c) Identifying critical attributes       (d) Query and probe nodes

| Technical Challenges | NETSTORM Capabilities |
|---|---|
| Analysis of large and complex networks | • Multi-attributed probabilistic network matching algorithms to infer different types of roles, interactions, and their dependencies<br>• Advanced network segmentation, clustering, and hierarchical mapping models to reduce complexity by several orders of magnitude |
| Dealing with uncertain and incomplete data | • Probabilistic network matching models to integrate reasoning over missing data, irrelevant entities and events, errors in collection, and deceptions<br>• Prioritization approaches based on maximizing information gain to guide collection |
| Dynamic network structures | • Hidden Markov Models applied to network dynamics detection, evolution, recognition and network learning |

FIG. 16

| Technical Challenge & Cycle | NETSTORM | | | |
|---|---|---|---|---|
| | Algorithms | Phase I | Phase II | Phase III |
| ANALYZE: Network size & complexity | Probabilistic multi-attribute network pattern matching) and Network state tracking to classify complex networks and Network clustering to reduce complexity. | Continuous approximation with stochastic sampling and iterative belief propagation. Aggregate data in time and space. | Add network clustering to segment 100K network into one hundred 1K candidate sub-networks. | Multi-attribute clustering enables hierarchical network mapping, reducing complexity further. |
| ANALYZE: Uncertain & Incomplete Data | Probabilistic multi-attribute network pattern matching and Network state tracking to resolve conflicting, missing, irrelevant, and uncertain data. | Network mapping performs inexact classification and removal of irrelevant data. Single distribution model. | Incorporate errors, deceptions, etc., as discrete process. Multiple distribution model. | Clustering and coarse mapping remove irrelevant data and aggregate ambiguous entities. |
| ANALYZE: Inter-dependence of Multiple Roles, Activities, and Features | Network Matching Algorithm exploits dependencies between nodes, links, and their attributes | Link attributes capture pattern's structural dependencies. | Features at one node/link can depend on features at another. | Multiple features at the same node/link are interdependent. |
| ANALYZE: Dynamic Network Structure | The Network State Tracking Algorithm to identify and adjust classification for evolution of network structures over time. | Allow new nodes and links. Network evolution based on known probabilistic state space. | Incorporate new attributes. | Ability to update model patterns & dynamics based on new features and new nodes. |
| ANALYZE/ PRIORITIZE: Learning network models | Network Model Learning Algorithm to learn network attributes and dynamic parameters from training data. | Single model network state attributes inferred from multiple data networks. | Learn network evolution dynamics from training data. | Learn multiple patterns occurring in data at the same time. |
| PRIORITIZE/ UPDATE/ COLLECT: Prioritization of Additional Data Collection | Guided Collection Planning Algorithm will prioritize collection points and questions that resolve ambiguity and maximize information gain. | A list of missing features and relations, collection of which would maximize information gain. | Create a decision tree as a plan for collection that maximizes information gain. | Add ability to adapt the collection plan based on new (unexpected) outcomes. |
| Information Loss across the Collect-Update-Analyze-Prioritize cycle | NETSTORM's network analysis algorithms do not discard conflicting information and maintain heterogeneous networks to ensure all information is fully exploited. | Desktop app informs PDAs about candidate predictions, which are further disambiguated during collection. | Light-weight search at PDAs to create alternative classifications using local data. Dual regional-local operation modes. | Devices communicate with each other to disambiguate information about same nodes/links. |

FIG. 17

| Capability | Method | Impact |
|---|---|---|
| Classify the observed entities and relations | Generate associations of data nodes with hypothesized roles and activities; the strength of such associations is captured by the score of the matching consistency | ANALYZE: Provide outcomes of inference to analysts & patrol members. Reason over noisy data |
| Infer hidden relations | Associated nodes with relations in a model network to data nodes without any observed relations | ANALYZE: Infer variables that were missing |
| Find multiple patterns and alternative predictions | Find multiple subnetworks in data mapped to a model network, and multiple mappings -- that score similarly given current noisy data | ANALYZE/COLLECT: Generate multiple network analysis predictions; use those to guide collection |
| Infer multiple roles and activities | Map multiple model nodes to a single data node | ANALYZE: Able to infer roles in complex networks |
| Efficiently remove irrelevant data | The nodes from the data network that are not mapped to model network(s) and that are not linked to the mapped nodes are deemed irrelevant (these nodes are stored but not returned as part of the match). | ANALYZE: Can reason about large scale networks with many irrelevant actors. Reduce the burden on analysts |
| Identify potential collection points | Probe nodes identified to maximize information gain of mapping results. Query nodes are either probe nodes or are connected to them (e.g., a person X who is a friend of person Y, associated with "local drug lord" role, might be of interest to U.S. to provide critical information about person Y). | PRIORITIZE/COLLECT: Find actors/entities/questions that could provide more information about entities of interest |
| Disambiguate conflicting reports | Make explicit mapping to observed feature subsets that may come from different reports. | UPDATE: Deconflict patroller reports |

FIG. 18

| | |
|---|---|
| Platform and GUI independence | Allows the results to be evaluated and deployed on various current and future platforms. |
| The ability to scale from 10K to 1M nodes | Supports the deployment environment scale of information |
| Performance of 1 minute on PDA and 2 hours on desk/lap-top systems | Supports the deployment environment performance requirements. |
| Support batch and incremental processing of the data | To support in depth analysis for data on the desk/laptop and incremental, near real time processing on the PDA |
| Commonality between handheld and headquarters environments | Allows the movement of algorithms and features between handheld and headquarters computing environments. |
| Support test harness driven execution of the algorithms | Algorithms will need to be tested with different data sets— first without and then with the integration environment |

FIG. 19

SYSTEMS AND METHODS FOR NETWORK PATTERN MATCHING

CROSS-REFERENCE TO RELATED APPLICATIONS

This application claims benefit to U.S. Pat. App. No. 61/600,811, filed Feb. 20, 2012, entitled "SYSTEMS AND METHODS FOR NETWORK PATTERN RECOGNITION" the entire contents of which are incorporated herein by reference.

STATEMENT REGARDING FEDERALLY SPONSORED RESEARCH OR DEVELOPMENT

This invention was made with Government support under Contract #FA8750-10-C-0199 and awarded by the U.S. Air Force Research Laboratory. The U.S. Government has certain rights in the invention.

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

Embodiments of this invention are generally related to data analysis, and to recognizing patterns in large data sets representing networks of entities such as people, places or things.

2. Description of the Prior Art

Network analysis is a growing field across many domains, including computer vision, social media marketing, transportation networks, and intelligence analysis. The growing use of digital communication devices and platforms, as well as persistent surveillance sensors, has resulted in explosion of the quantity of data and stretched the abilities of current technologies to process this data and draw meaningful conclusions.

Elucidation of network structural organization, connectedness, and relevance in complex environments, such as counter-insurgency operating environments, represents a challenge for social network analysis. This is due to a complex convolution of the evolving size and nature of individual networks operating over widely-varying geographic extents, with differing intent and visibility, and with varying degrees of overlap between network types. These characteristics result in practical issues, namely highly-fragmented, uncertain, noisy data coupled with significant time-dependent behavioral changes. Because of the complex nature of counter-insurgency operations, it is not just a matter of identifying stable networks of well-defined "bad guys." It is necessary to understand the complex social networks within which shifting allegiances create an ever-changing threat. Constant monitoring and reasoning about the status of adversarial activities and relationships is mandatory for accurate situational awareness. Thus there is a need for accurate, effective, and generalizable tools for rapidly revealing and analyzing networks of individuals, organizations, activities, places, and resources.

Current technologies fall far short of these goals. For example, social network analysis techniques cannot find relational patterns in data nor filter out irrelevant entities; traditional interaction analysis models cannot remove noise from data or work at different levels of granularity; traditional probabilistic temporal activity tracking and actor profiling cannot find patterns of interdependent multi-type activities performed by multiple actors in parallel in both space and time; and parallel plan recognition models assume that data association of observed entities and their roles is already known, and the signal-to-noise ratio is significant. Yet characteristics that current approaches lack are helpful for achieving robust elucidation of relevant networks for complex environments such as in counter-insurgency operation networks.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

One example embodiment of systems and methods for network pattern matching provides the ability to match network patterns from noisy data sources using probabilistic multi-attribute graph matching analysis.

In one embodiment of the invention, the systems and methods for network pattern matching provides computer implemented method for determining a network pattern match, said method comprising representing a plurality of data nodes and a plurality of data links of the data nodes as a data network, representing a plurality of model nodes and a plurality of model links of the model nodes as at least one model network and finding at least one match from the at least one model network to the data network. In some embodiments, the data network and the at least one model network are each represented as a multi-attributed graphs and finding the at least one match from the at least one model network to the data network comprises utilizing a probabilistic multi-attribute graph matching analysis. In some embodiments, the step of finding of at least one match from at least one model network to the data network utilizing a probabilistic multi-attribute graph matching analysis comprises defining a network mapping as a binary matrix of a plurality of node mappings between a plurality of model nodes in the model network and a plurality of data nodes in the data network, defining a network mapping value as a posterior probability of the network mapping, utilizing a belief propagation algorithm to approximate a distribution of the network mapping values and determining the at least one match as the network mapping with the network mapping value which exceeds a network mapping value threshold. In some embodiment, the node mapping is determined by a probability of at least one match between the at least one data node attribute and the at least one model node attribute. In some embodiments, the step of utilizing a belief propagation algorithm to approximate a distribution of the network mapping values comprises determining a marginal posterior probabilities of one of the plurality of node mappings between one of the plurality of model nodes and one of the plurality of data nodes and utilizing statistical sampling over the marginal posterior probabilities to determine the network mapping value. In some embodiments, the at least one model link further comprises at least one dependency between one of the plurality of model nodes and another of the plurality of model nodes. In some embodiments, the probabilistic multi-attribute graph matching analysis utilizes a network clustering technique. In some embodiments, the data network further comprises at least one data subnetwork and finding the at least one match from the at least one model network to the data network utilizing the probabilistic multi-attribute graph analysis comprises finding the at least one match from the at least one model network to the data subnetwork utilizing the probabilistic multi-attribute graph analysis, In some embodiments, the data network further comprises at least one data subnetwork having at least one data subnetwork node and utilizing a belief propagation algorithm to approximate a distribution of the network mapping values comprises classifying each data subnetwork node as one of a corresponding node or a mismatch node, the corresponding node having a node mapping to a model node of the at least one model network, the mismatch node not having a node mapping to a model node of the at least one model network, determining a correspondence value for each data subnetwork representing a value of corresponding nodes, determining a marginal posterior probabilities of one of the plurality of node mappings between one of the plurality of model nodes and each of the corresponding nodes for each data subnetwork exceeding a correspondence value and utilizing statistical sampling over the marginal posterior probabilities to approximate a distribution of the network mapping values. In some embodiments, the data network further comprises at least one data subnetwork having at least one data subnetwork node, each data subnetwork node comprising data node attributes, each model node comprising model node attributes, the finding the at least one match from the at least one model network to the data network utilizing a probabilistic multi-attribute graph matching analysis comprises classifying each data subnetwork node as one of a corresponding node or a mismatch node the corresponding node corresponding to a model node of the at least one model network, the mismatch node not corresponding to a model node of the at least one model network, determining a correspondence measure for each data subnetwork representing a number of corresponding nodes, computing a marginal posterior probability estimate on each data subnetwork exceeding a correspondence measure threshold, utilizing a probabilistic multi-attribute graph matching analysis, determining a weighted sum over the attributes of mapped model nodes where the weights are computed based on marginal posterior probability estimates computed utilizing a probabilistic multi-attribute graph matching. In some embodiments, the data node represents a person, the at least one node attribute represents a preference for action of the person, the data link represents an observed signal of the person and finding at least one match from the at least one model network to the data network defines at least one attribute for the data node from the at least one model network.

In some embodiments, the plurality of data nodes and the plurality of model nodes further comprise at least one node attribute, the plurality of data links and the plurality of model links further comprise at least one link attribute, the data network and the at least one model network are each represented as a multi-attributed graphs and finding the at least one match from the at least one model network to the data network utilizing a probabilistic multi-attribute graph matching analysis. In some embodiments, the node represents an entity, the at least one node attribute comprises at least one choice attribute representing a preference for action of the entity and the at least one link attribute comprises at least one signal attribute representing a probable observed signal by a sensor of the choice attribute. In some embodiments, the at least one node attribute and the at least one link attribute each further comprise a statistical distribution value. In some embodiments, the data network and the at least one model network are multi-dimensional matrices each data node and each model node is a multi-dimensional vector and each data link and each model link is a multi-dimensional vector. In some embodiments, the preference for action of the person is a profile attribute of the person from a social networking website and the observed signal of the person is a communication with another person.

One embodiment of the systems and methods for network pattern matching provides a network pattern matching system for determining a network pattern match comprising a processor and a non-transitory computer readable medium having a computer readable program code embodied therein, said computer readable program code configured to be executed to implement a method comprising: representing a plurality of data nodes and a plurality of data links of the data nodes as a data network, representing a plurality of model nodes and a plurality of model links of the model nodes as at least one model network and finding at least one match from the at least one model network to the data network.

One embodiment of the systems and methods for network pattern matching provides a computer program product for determining a network pattern match comprising a non-transitory computer readable medium having a computer readable program code embodied therein, said computer readable program code configured to be executed to implement a method for determining a network pattern match comprising: representing a plurality of data nodes and a plurality of data links of the data nodes as a data network, representing a plurality of model nodes and a plurality of model links of the model nodes as at least one model network and finding at least one match from the at least one model network to the data network.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 16 is a tabular summary of some capabilities of one embodiment of the network pattern recognition system;

FIG. 17 is a tabular summary of some of the challenges addressed by one embodiment of the network pattern recognition system;

FIG. 18 is a tabular summary mapping some of the capabilities of the NETSTORM embodiment of network pattern recognition; and FIG. 19 is a tabular representation of architectural consideration for the NETSTORM embodiment of the network pattern recognition system.

DETAILED DESCRIPTION OF THE INVENTION

Figure 1:
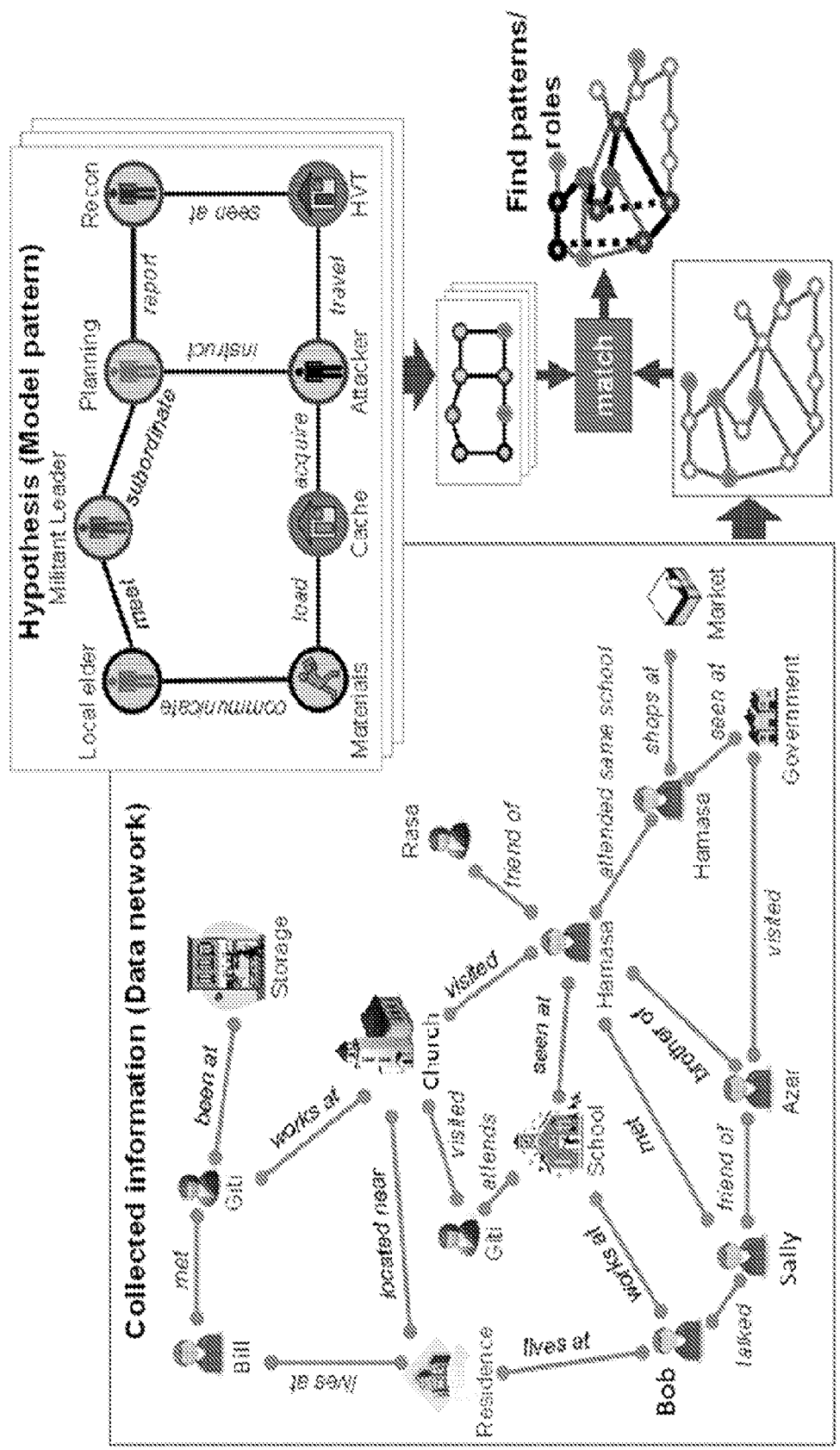
FIG. 1 is a graphical summary of some of the challenges facing embodiment of network pattern recognition systems.

Systems and methods to match network patterns will now be described in detail with reference to the accompanying drawings. It will be appreciated that, while the following description focuses on a system that does network pattern recognition, the systems and methods disclosed herein have wide applicability. For example, the systems and methods to recognize network patterns described herein may be readily employed with intelligence gathering systems, social network systems or visual monitoring systems. Notwithstanding the specific example embodiments set forth below, all such variations and modifications that would be envisioned by one of ordinary skill in the art are intended to fall within the scope of this disclosure.

Example embodiments of systems and methods for network pattern recognition provide the ability to identify hidden networks (formal and informal; adversarial, neutral, and friendly) from noisy data sources using probabilistic attributed graph matching algorithms. The algorithms may map roles (nodes in model networks) and "patterns" (generated from a hypothesis library) to observed actors (nodes in observed or data networks). The outcome is a set of plausible network models, rank-ordered by probability.

The pattern-matching methodology of these systems and methods enable the solution of three of the real-world challenges associated with social network analysis, namely network size and complexity, uncertain and incomplete data, and dynamic network structure. Furthermore, it supports the rapid and integrated execution of the social network analysis.

Example embodiments of these systems and methods for network pattern recognition may be able to:

intrinsically detect patterns in data. This provides a rapid and complete picture across many parameters of interest, and is helpful to both assessing data irrelevance and performing deconfliction and disambiguation, e.g. eliminating the need for arbitrary discarding of data;

model networks with multiple attributes, by integrating space, time, influence, and interaction semantics in a single unified framework. This provides a depth of reasoning and sense-making that is not possible using single-attribute techniques, even when applied sequentially;

capture interdependencies among threat behaviors, activities, and roles, increasing the accuracy of proposed data elicitation and collection recommendations;

effectively remove irrelevant data from classification, but not discard conflicting information to ensure that all data are fully exploited;

model networks evolving over time and space; and support the addition of features, nodes, and links over time;

utilize novel multi-attribute network clustering and aggregation techniques to reduce network complexity and provide revolutionary computational acceleration (e.g., speed per node). This acceleration, coupled with the intrinsic pattern matching feature, facilitates the parsing of the entire network for local updates and analysis, and the incorporation of "light" versions of the network pattern matching system onto mobile handheld devices such as PDAs;

enable analysts to define their own hypotheses and patterns, and support them by learning repeating network patterns from data; and find and prioritize collection needs that maximize information gain, to achieve the highest improvement of situational understanding.

Example embodiments of these systems and methods for network pattern recognition utilize an empirically-validated NetSTAR (Network Structure, Tasks, Activities, and Roles) network analysis platform, but with enhancements. Some of these enhancements include: (1) extension of the networks of interest to heterogeneous representations of individuals, groups, events, vehicles, and locations; (2) improvement of the algorithm efficiency and speed through advanced clustering methodologies; and (3) extensions to support collection and decision-making for a range of local (handheld) and regional (laptop/desktop) use cases.

The pattern-matching core of the disclosed systems and methods is general in nature, and thus can be adapted to a broad range of network/data types, market applications, and geographic locations. Additionally, we anticipate that the deep sense-making insights and computational acceleration afforded by these systems will find significant applications in the interpretation and mining of the vast quantities of data generated in the social networking sphere.

Operational and Technical Challenges

One operational challenge facing U.S. forces in the current military engagements is the capture and maintenance of the relationships and interactions that occur within the local populations. For instance, battalions, which operate in areas of ten to a hundred square miles, need to establish local situation understanding in all of the sub-areas within their area of operations (AO) and build relations with the local population such as store owners/workers and possible city/town/village leaders. The units assigned to subareas of the AO examine the human intelligence and other intelligence to build a picture of the local formal and informal networks. Analysts use this information to identify recruiters, members of potential militia and their supporters, weapons suppliers, potential places of operation and training, and targets that insurgents might want to attack. Units also use this information to understand how local power is distributed and how to establish relationships that allow them to influence the attitudes and actions of the local population.

In a counterinsurgency example, hostile organizations must stay "invisible in plain sight" to coalition forces in order to survive. The ability to find these particular activities indicative of future threatening behavior is complicated by the presence of background noise provided by innumerable benign activities. Despite the difficulty, making sense of these data is critical to the ability to disrupt hostile actions. Adversaries adapt and change their tactics over time, complicating this task further.

The data collected about these activities are highly fragmented, noisy, and constantly changing, requiring constant monitoring and reasoning on the part of analysts. Expert planners and commanders have extensive experience, which allows them to manually find patterns in data (abstracted in FIG. 1). However, in a large AO, the data about social and organizational networks quickly becomes too numerous, noisy, and complex for human analysts to comprehend manually, and so intelligence gaps are created.

Today, several technological barriers exist to efficient network pattern matching. Some of these technical barriers are outlined in FIG. 17. First, analysts have to deal with huge datasets, in which the number of nodes and features reach to millions. Such data is hard to process manually, requiring automated solutions. However, due to significant amounts of irrelevant data (i.e., the ratio of irrelevant to relevant nodes is 100:1 or more), current automated pattern finding solutions are not able to provide real-time network analysis. Instead of reasoning about the network, current tools are focused on drawing and visualizing the network with minimal filtering, thus leaving all pattern-finding work to the network analyst. Significant uncertainty in relevant data (missing entities and features; errors due to deceptions and data coding; and ambiguity about the attributes of nodes and relations) is preventing data mining applications from finding patterns of interest. This is further complicated by the fact that networks adapt and change over time (i.e., there are new nodes, links, attributes. Roles and activities change. Networks adapt to actions taken against them). Finally, current tools are hampered by the inability to collect and disseminate data and share hypotheses and lessons learned in structured format among analysts and data collection teams.

Four commonly used network analysis tools are AXIS PRO, AnalystNotebook, Palantir, and StarLight, which are often used in conjunction with technologies performing data mining and automated entity and link discovery from text sources. These applications allow users to visualize and explore captured social networks, but provide little or no support for finding complex patterns or behaviors of interest in those networks.

Other traditional behavior profiling and network analysis techniques have limitations:

Social network analysis (SNA) models apply simplified assumptions to compute graph-theoretic measures for role classification of observed/data nodes (Xu and Chen, 2005; Monge and Contractor, 2003) and network state tracking (Coffman and Marcus, 2004; Chung et al., 2006). These models assume that all data are generated by a single network pattern, and hence cannot reason about multiple patterns and remove irrelevant entities for each pattern of interest. Among many drawbacks, SNA measures cannot filter out irrelevant but connected individuals, do not account for uncertainty, and lose structural aspects of networks by aggregating them into network position scores. As the result, these models cannot find small relational patterns in large datasets.

Traditional interactions analysis models—including differential equations (Turchin, 2003), agent-based simulations (Popp, Allen, and Cioffi-Revilla, 2006), and others—are not able to "remove the noise" from the input data. Furthermore, none of these models are able to work with data sources at different levels of granularity.

Traditional probabilistic temporal activity tracking and actor profiling looks at patterns of activities performed by a single individual or a whole group to determine its role, threat indicator, intent, goal, or future actions (Stolfo, 2003; Brown, Dalton, and Hoyle, 2004; Schrodt and Gerner, 2001; Yin et al., 2004). These models cannot find patterns of interdependent multi-type activities performed by multiple actors in both space and time in the presence of significant number of irrelevant activities and actors.

Parallel plan recognition models including propagation network models (Shi et al., 2004) and factor-graph based methods (Davis, Olson, and Carley, 2008) can reason about multiple parallel observations and track evolution of hidden plans and goals. However, these models assume that the association of data entities with model entities has already occurred and that little or no irrelevant data are present, which is unrealistic in real-world applications.

One example embodiment of the systems and methods disclosed is to develop network analysis and collection planning algorithms to support the integrated social network analysis. These system and method algorithms may be part of a decision support system that supports network analysts, intelligence analysts and planners in collecting human intelligence data, market intelligence data and developing understanding about networks of entities. In this example embodiment, the following results should be available: (1) documentation for algorithms used in the system; (2) documentation of experimentation results and corresponding data; (3) software independent component proof-of-concept prototypes and implemented integrated software system with corresponding source code—with both Desktop and PDA applications.

As used throughout this description, one example embodiment of a system for network pattern recognition for is entitled a NETwork STructural Organization and Relevance Mapper (NETSTORM) system.

This example embodiment, there are at least four benefits the solution can provide to users:

Improved situational understanding will be achieved by increasing the accuracy of network analysis, in particular classification of nodes and subnetworks and forecasts of their future behavior in the presence of noisy and incomplete data.

Reduced time for analysis cycle will be achieved by reducing the time it takes the inference and classification algorithms to run on large-scale datasets.

Increased relevance of collection needs will result from a more accurate determination of collection points and tie-in of collection to current situation assessment state. This will result in an increase in the efficiency of collection operations.

Improved data sharing will be enabled by allowing analysts to share their hypotheses, lessons learned, and predictions.

The example embodiment builds on several main algorithmic approaches. Examples of these algorithmic approaches include:

Modeling networks using multi-attributed dynamic graphs allows integrated reasoning about different types of complex roles and relations.

Network Recognition: Probabilistic network matching algorithms allow detecting patterns in noisy data during the analysis phase. Example embodiments may integrate inexact network pattern search and classification of multiple relations and roles, exploiting dependencies in patterns of threatening and normal activities to improve recognition accuracy. Embodiments include efficient solution algorithms for what is otherwise a hard combinatorial problem, using methods in non-linear optimization, stochastic search, and factor graph models.

Dynamic Network tracking algorithms allow recognizing networks that change over time, supporting the network analysis phase. The temporal pattern recognition models are combined with network matching algorithms to filter out irrelevant data and assure correct data association. The latter methods are critical enablers for solving real-world problems in which the actors' involvement in the tracked network is not known a priori (a key assumption that has allowed temporal network tracking solutions to work on toy problems).

Network model learning algorithms are used for generating frequent models of networks and their dynamics from previous experiences that are hard to define manually.

Network clustering algorithms enable disclosed network analysis models to scale to large datasets by segmenting the data into smaller subnetworks and clustering nodes for scalable hierarchical matching solutions by efficiently encoding similarity in features and relations.

Guided collection planning algorithms are technologies to support network analysis. Embodiments identify and prioritize collection points and questions to achieve maximum information gain (disambiguation) from collected data. The collection plan is an adaptive policy tracked and adjusted over time, based on new information, to suggest next collection actions that will iteratively update predictions and classification results, resolving inconsistencies and misleading information.

Proof points in the applicability of this solution are shown in several studies leading to this solution. First, empirical studies of these embodiment show that these algorithms achieve high (above 70%) accuracy in finding patterns and nodes in the data, with 2.5× improvement over human analysts performing the same task. Second, computational experiments show that such accuracy can be extended to large-scale networks. Incorporating dependencies among nodes in the patterns can lead to the ability to handle much higher noise levels and efficiently remove large amounts of irrelevant data. Finally, the network clustering embodiments suggest that high reduction of complexity can be achieved, thus illustrating that analysis solutions can scale to hundreds of thousands to millions of nodes.

One Example Embodiment of Methods for Network Pattern Matching

This section presents a description of the technical approach for one embodiment of the disclosed systems and methods, the NETSTORM system and methods. Details about the components, models, and algorithms of the NETSTORM system are provided.

The NETSTORM embodiment is designed to address three challenges of network situation understanding: analysis of complex large-scale networks, overcoming uncertainty and incompleteness of collected data, and ability to reason about network structures that change over time. FIG. 16 provides a summary of NETSTORM capabilities in relation to these challenges. These capabilities are also described in more detail herein.

The NETSTORM Technical Approach

The methods and systems disclosed address the above mentioned weaknesses by explicitly accounting for: (1) multiple features (attributes) and dependencies among actors, (2) the dynamic nature of network patterns over time, and (3) the unknown association of observed data nodes with hypothesized pattern (model) nodes. NETSTORM can allow extraction, classification, and dynamic tracking of networks using multi-source and multi-level data. In addition to identifying the current and future states of networks, the models facilitate the design of HUMINT collection plans to reduce the ambiguity in current predictions.

NETSTORM builds upon an empirically validated network pattern recognition technology called NetSTAR (Network Structure, Tasks, Activities, and Roles). The NetSTAR project investigated the problem of recognizing hidden network patterns and roles of individual actors from noisy data sources using probabilistic attributed graph matching algorithms (Levchuk and Chopra, 2005; Levchuk, et al., 2006; 2007). Probabilistic graph matching algorithms have several advantages over traditional approaches of individual actor mapping and network analysis, in part because the essential phenomenon is not executed at the individual actor level, but at the organizational level. Combining individual and network properties to perform network pattern search reduces ambiguity and allows us to reliably find hidden networks under high levels of noise. In our empirical and computational experiments, NetSTAR algorithms significantly outperformed human analysts in finding correct patterns and roles of actors (2.5 times better accuracy), achieving over 70% accuracy in network and role recognition based on observed data with 50% missing data and 30% deceptions (see Section 2.9). The baseline NetSTAR algorithm has been modified for use in finding network patterns in several domains (e.g., recognition of adversarial missions, complex urban activities, and facility networks and supply chains).

To achieve scalability to large graphs, network clustering algorithms may be used for segmentation and hierarchical mapping.

Figure 2A:
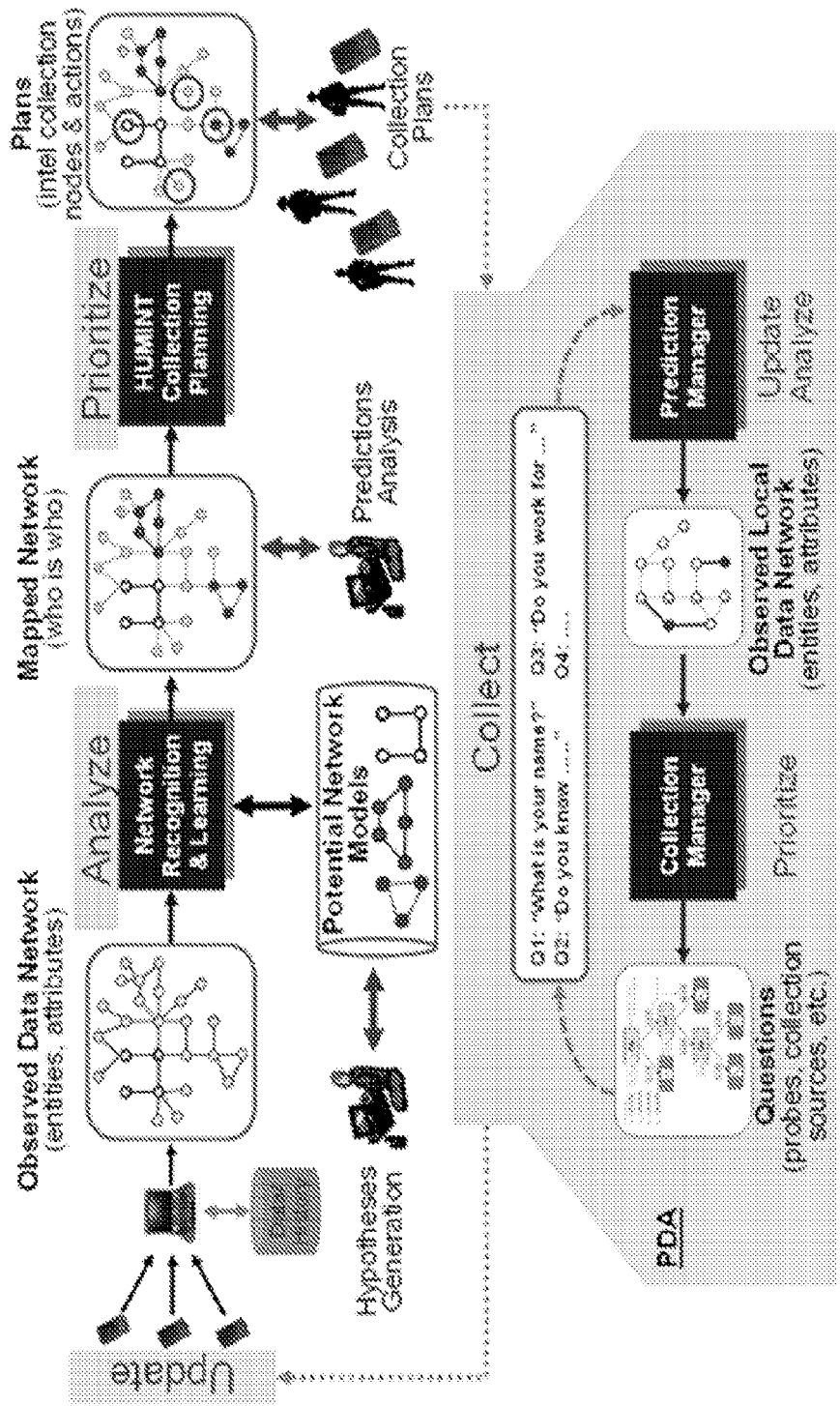
FIG. 2A is a graphical summary of components of one embodiment of the network pattern recognition system.

FIG. 2A provides an overview of the high level components of one embodiment of NETSTORM. NETSTORM's capabilities are indicated in the blue boxes in FIG. 2A. One capability of NETSTORM is in Network Analysis and Learning in the Analyze part of a collect-update-analzye and prioritize cycle. NETSTORM's algorithms may identify constantly evolving networks based on uncertain and incomplete data, may do so in a form that is computationally efficient, and may perform within tight time constraints.

Based on differences between multiple predictions generated by network pattern recognition, NETSTORM will make recommendations for collecting information supporting the prioritize part of the cycle. The analyze and prioritize functions may be performed on a laptop and can potentially cover a large area of operations. Based on prioritization, a collection plan for a limited area is delivered to a PDA for the collect part of the cycle. NETSTORM also supports data collection through a Prediction Manager and a Collection Manager that run on a PDA and interacts locally with analysts as they collect data in the field to disambiguate predictions, find their local updates, and reprioritize collection needs. Results are then uploaded in the update part of the cycle.

Subsections below discuss in detail the algorithms that will underlie the capability in each of the boxes in FIG. 2A. The technical discussion begins with and is primarily focused on Network Recognition and Learning. However, the Collection Planning, Prediction Manager, and Collection Manager capabilities are also described in detail in subsequent sections.

Figure 2B:
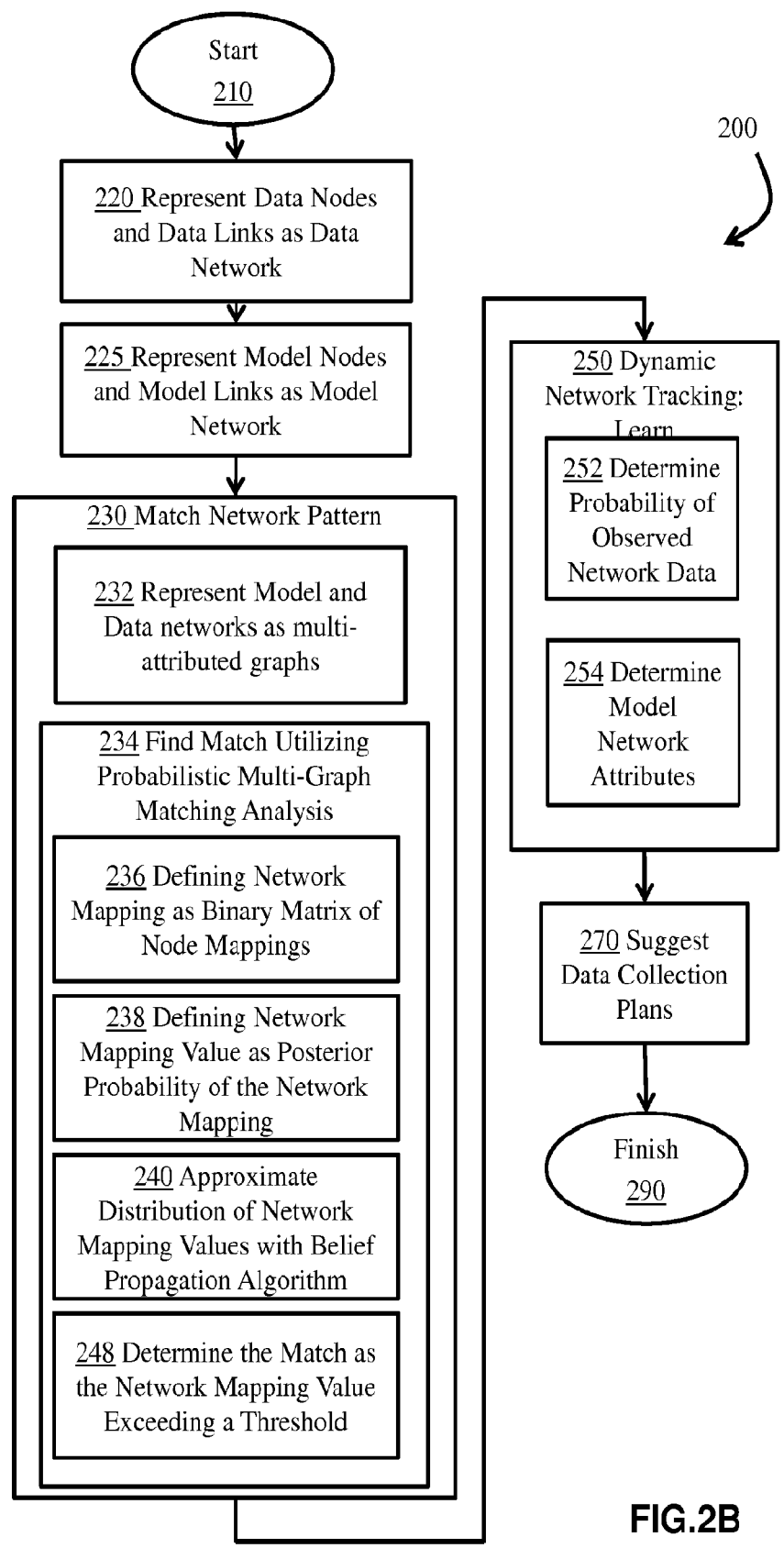
FIG. 2B is a process flow diagram summarizing one embodiment of methods for pattern recognition.

FIG. 2B provides an outline of the general methods followed by one embodiment of a method for network pattern recognition. In general, the method 200 comprises representing a plurality of data nodes and a plurality of data links of the data nodes as a data network at 220, representing a plurality of model nodes and a plurality of model links of the model nodes as at least one model network at 225 and finding at least one match from the at least one model network to the data network at 230. These methods are detailed more in the sections below.

Modeling Complex Networks

In this section we explain how the disclosed systems and methods can reason about complex networks and behaviors. We introduce the multi-attributed networks of NETSTORM and describe how these solutions can find patterns of well-formed model networks in the noisy, imperfect real-world data. We then complete this section by discussing how networks may change over time and how this change will be modeled in NETSTORM.

There are many complex real-world phenomena that can be represented using networks. While the example in FIG. 1 showed single connections among people, in the real world there will be many types of interactions, dependencies, and features of entities and relations that need to be accounted for. In order to analyze and reason about such complex behaviors, multiple properties of entities and their relations must be explicitly taken into account. To solve this challenge, NETSTORM models networks as multi-attributed graphs consisting of attributed nodes and links to account for complex relationships and dependencies between real-world entities, reaching beyond traditional SNA approaches.

Nodes and relations in the networks: The network nodes are either 1) observed, or data nodes about specific entities from collected data, or 2) model nodes representing labels that an analyst may seek to infer based on observed data. Data nodes can include actors (specific individuals or groups) and geographic areas (locations and facilities), while model nodes can include tasks (short-term activities performed by actors at geographic areas; e.g., supply purchase, reconnaissance) and roles (conceptual abstractions of behaviors, intents, and activities associated with actors or areas). The relationships (links) among nodes can similarly be categorized as observed/data or model, attributed according to the following nodal relations: temporal, spatial, interaction, and influence.

Representing networks using multiple attributes: To efficiently encode the content and structure of the network, we utilize a multi-attributed network representation; where node attributes define profiles of activities, roles, actors, and geographic nodes and; where link attributes define profiles of relations among entities, encoding temporal and spatial dependencies, interaction relations, and influence among different nodes.

Multiple attributes are used to represent different types and quantities of data and hypotheses. We distinguish two classes of attributes: 1) choice attributes define a preference for action based on an entity's physical capabilities, intent, or social proclivity (e.g., a person with above high-school education can participate in planning activity of the enemy network); 2) signal attributes define how the role, activity, or their relation may be manifested and observed via sensors (e.g., a person assuming a significant position in the ranking of local militia will be meeting with village elders to gain their support). Distinguishing among these two classes of attributes is helpful for integration of forecasting and recognition modeling, as choice and signal attributes are treated differently algorithmically when deriving the objective functions for network pattern recognition. Attributes can be obtained from events collected by sensors, including human collection teams, unmanned vehicles, radars, cyber nodes, etc. These events may contain information about time, location, actors, and their attributes.

Figure 3:
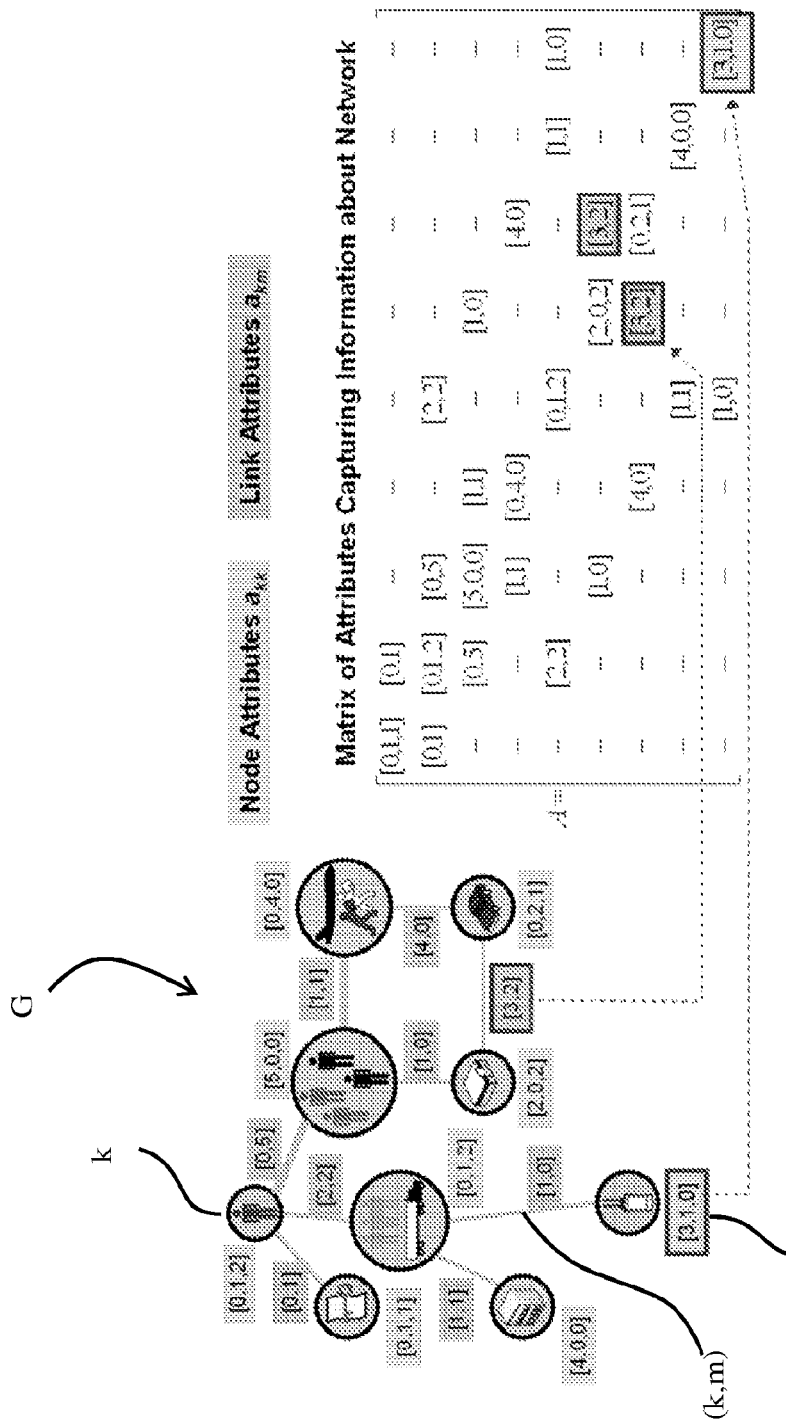
FIG. 3 is an example graphic representation of a network and its representation using attributes.

Referring to FIG. 3 which illustrates an example of a network and its representation using attributes. In FIG. 3, formally we represent a multi-attributed network as a graph $G=(V^G, E^G, A^G)$ consisting of nodes $k \in V^G$, links $(k,m) \in V^G$, and their attributes $a_{km}^G \in A^G$, where $A^G=\{\underline{a}_{km}^G\}$, is a multi-dimensional matrix of node and link attributes: every node k in the network is described using an L-dimensional vector $\underline{a}_{kk}^G=[a_{kk}^G(1), \ldots, a_{ij}^G(L)]$, and every link (k,m) is described using an R-dimensional vector $\underline{a}_{km}^G=[a_{km}^G(1), \ldots, a_{ij}^G(R)]$.

When analyzing complex networks in the presence of uncertainty and variability of human behaviors, the patterns of networks of interest and data need to be defined in a flexible manner. To address this challenge, values of individual attributes in our representation can be single numbers, ranges (e.g., meeting is expected to last between 5 and 20 minutes), or distributions (e.g., number of communications between an executive and his second in command may conform to Poisson distribution). The modeling of attribute values using statistical distributions is particularly useful if the network data is aggregated over time (e.g., relation formed by counting all meetings between two people in a week) or more primitive entities (e.g., people who together form the group node).

Distinguishing data and model networks: We distinguish networks of observed nodes and observed links, also called networks of data nodes and data links, which we call data networks and represent using notation $D=(V^D, E^D, A^D)$, and networks of model nodes and links, which we call model networks and represent using $M=(V^M, E^M, A^M)$. Data networks can range from hundreds to millions of nodes in size, while model networks mostly consist of tens of nodes.

The model networks are hypotheses (patterns) that analysts may define and seek to find in the data. They can include at-risk (threat) networks as well as normal networks that may be of interest (e.g., networks of supplies in the area, networks of power influence, etc.). The specific code labels (e.g., "pro-", "neutral-", "anti-") can be assigned at individual model network nodes or at the network level. Model attributes then specify what attributes could be observed for the corresponding node and link, while data attributes specify the attributes that were actually observed.

Network Pattern Recognition

Figure 4:
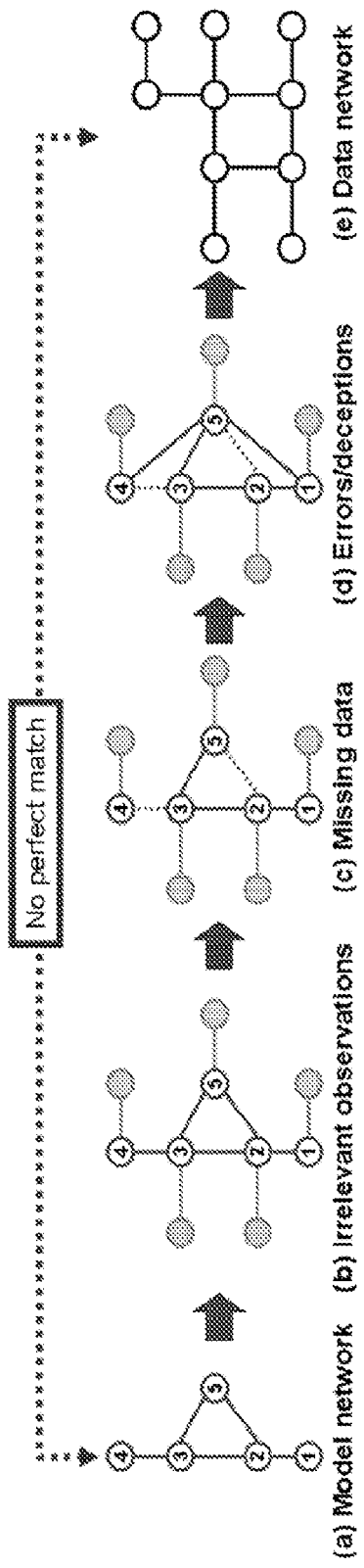
FIG. 4 is a graphic example of generating data from a model network.
Figure 5A:
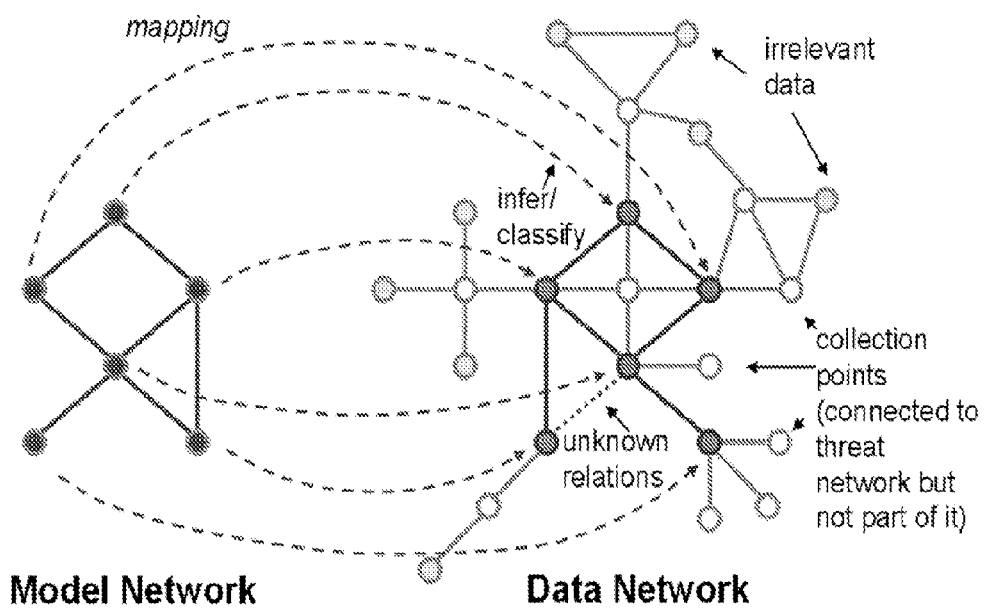
FIG. 5A is a graphic example illustrating the node-to-node mapping from model network to data network.

Network pattern recognition and classification using node-to-node mapping: One of the challenges of the any social network analysis is to analyze noisy data to find meaningful information about actors and identify their patterns of behavior. To address this challenge, NETSTORM views data as partially generated by some hidden model networks. Therefore, finding true roles and activities of collected entities is equivalent to searching for model network patterns in the available data. When the data network is noisy, its subgraphs/subnetworks will not perfectly match the model network (FIG. 4) and thus we must find subgraphs/subnetworks with the "best partial match" using probabilistic multi-attribute network analysis or probabilistic multi-attribute graph matching analysis. A single node-to-node match is represented as a set of assignments, also called a node mapping, from model nodes to data nodes (FIG. 5A). Finding the network mapping between model and data networks allows us to address several challenges as shown in FIG. 18.

Figure 5B:
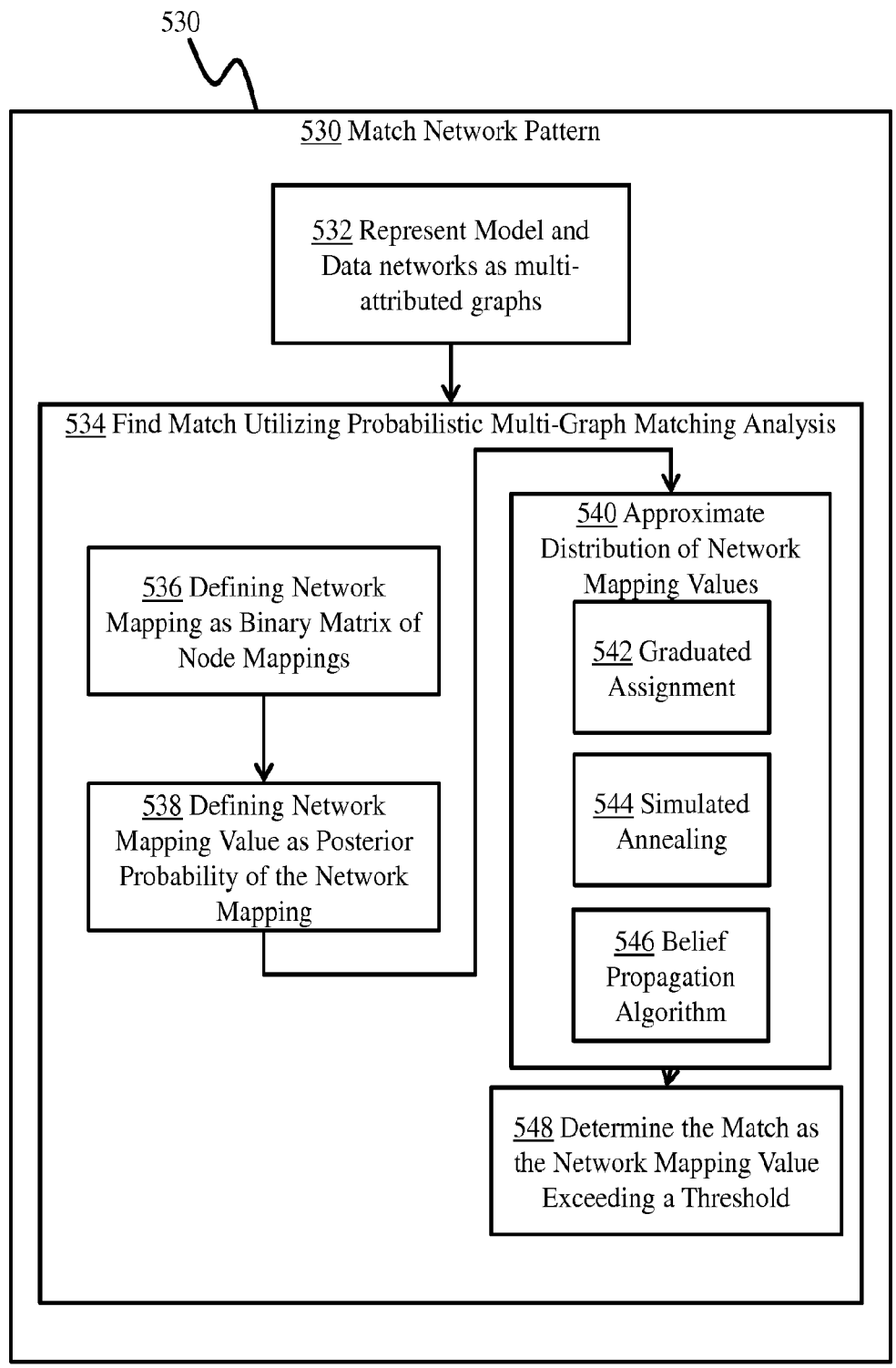
FIG. 5B is a process diagram of one example embodiment of methods of recognizing network patterns.

FIG. 5B illustrates the general activities to perform probabilistic multi-attribute graph matching analysis referencing to the above description of model and data nodes, links and networks. In some embodiments, the data network and the at least one model network are each represented as a multi-attributed graphs at 532 and then, at 534, then at least one match from the at least one model network to the data network is found utilizing a probabilistic multi-attribute graph matching analysis. In some embodiments, the probabilistic multi-attribute graph matching analysis comprises defining a network mapping as a binary matrix of a plurality of node mappings between a plurality of model nodes in the model network and a plurality of data nodes in the data network at 536, defining a network mapping value as a posterior probability of the network mapping at 538, utilizing a belief propagation algorithm to approximate a distribution of the network mapping values at 540 and determining the at least one match as the network mapping with the network mapping value which exceeds a network mapping value threshold at 548. In some embodiments, the approximating a distribution of the network mapping values may also be performed using graduated assignment 542 or simulated annealing 544.

Figure 6:
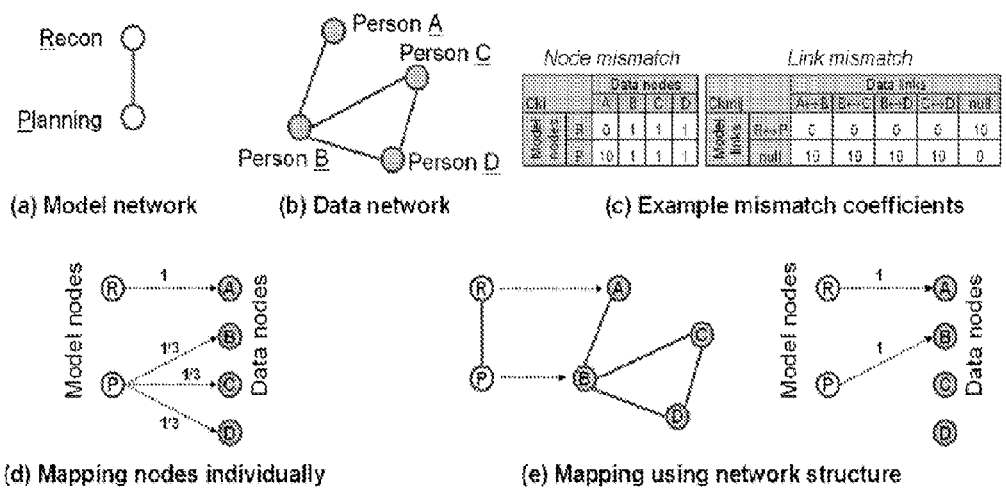
FIG. 6 is a graphical representation of examples of resolving missing and erroneous information using partially available data and dependencies in the model patterns (solid lines indicate communication dependencies)

We use model networks to capture dependencies between aggregated behaviors and roles that might be indicative of a threatening situation, but which individually are not considered to be hostile. Dependencies allow us to find complex network patterns of interest that include temporal, spatial, influence, and interaction dependencies encoded on the links between the roles and activities in the model network. Dependencies also constrain the number of possible mappings between data and model nodes, as shown in FIG. 6, where a four node data network (FIG. 6(*b*)) is being mapped to a two node model network (FIG. 6(*a*)). When mapping individually, multiple alternatives exist (FIG. 6(*d*)), but if dependencies, provided by structural information of both networks (FIG. 6(*c*)) is considered, we obtain a single accurate mapping (FIG. 6(*e*)).

Dynamic Network Tracking

NETSTORM provides robust analysis that targets three dynamic elements of evolving networks—network changes in data, mapping, and model changes—to capture a wide range of operationally relevant behaviors.

Changes in data: New data may become available about the actors and geographic areas as updated intelligence becomes available from collection activities. Our network pattern matching algorithm can iteratively incorporate new nodes by extending the set of mapping alternatives (data nodes) and updating the mismatch matrices in three ways: 1) recomputing the node and link mismatch coefficients if the relationship between new and existing attributes or model nodes is presented; 2) relearning network patterns if the new attributes could be computed for existing previous data; and 3) over time learning the correlation between new and existing features and adding update model networks with features for improved pattern distinguishability.

Changes in mapping: We handle changes in entity roles/activity over time by incrementally changing the mapping matrix estimates. The modification to the current mapping algorithms will involve both spatio-temporal clustering of observations and temporal weighting of event data that would allow treating most recently observed data more importantly.

Changes in model: We consider model network state changes over time (i.e. a specific model node may change roles/activities it performs, while others remain the same) to be attribute changes, thus we can write the state u of the model using attribute matrix $A^M(u)=[a_{km}^M(u)]$. The model networks can change the state statistically using the probability of network state transition, $p_{uv}^M=Pr(A^M(v)|A^M(u))$. As a result, in addition to finding the mapping of the model to data nodes, we need to find the true state of the model network, accounting for the model network state evolution dynamics.

Figure 7:
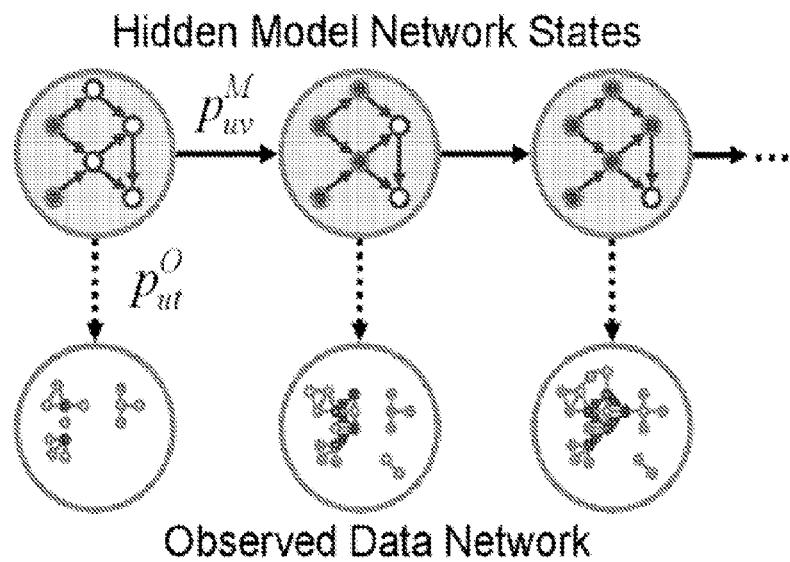
FIG. 7 is a graphical representation of examples of network evolution.

In NETSTORM, capturing rich changes in the model network state is handled using two approaches that can together be used to model a wide range of temporal and relational network dynamics. The first is based on a theory of network changes that specifies how a network can respond structurally to external influences, including removal of the nodes and their relations (see for example Carley and Prietula, 1994; Ashworth, and Carley, 2004). The second approach is based on temporal networks modeling, where a model network is a plan consisting of activities executed over time (see Levchuk et al, 2008; Davis, Olson, and Carley, 2008). Precedence constraints among activities constrain when the tasks' state changes may occur. An example of such network evolution is shown in FIG. 7. The state of the model network changes as the tasks are completed and is unknown (and needs to be identified from data), while the data network state changes as the events and interactions from task completion and other irrelevant behaviors appear in the data.

NETSTORM Algorithms for Network Analysis

This section covers algorithms used in the NETSTORM embodiment. First, complex network patterns need to be found in data, and we achieve this using a probabilistic network pattern matching algorithm based on a Belief Propagation model and Network State Tracking models, which detect and classify adaptive networks and are designed to deal with noisy data with a large number of irrelevant entities. We provide technical solution details of these algorithms and we describe algorithms for learning network parameters from historic data, which is needed as an enabler for complex network analysis when manual specification of patterns of interest is challenging to perform manually.

Probabilistic Multi-Attribute Graph Matching Algorithms for Network Analysis As described above, the NETSTORM embodiment finds patterns in data and classify networks using node-to-node mapping or node mappings. Formally, the network mapping from model network to data network is defined as a binary 0-1 matrix $S=[s_{ki}]$ (where $s_{ki}=1$ if a node k from model network $A^M$ is mapped to a node i in the data network $A^D$). We assume that data networks are generated randomly from model networks: if we know that the data node i (e.g., observed profile of a person) was generated by model node k (e.g., hidden role of a person), then the attributes $\underline{a}_{ii}^D$, are random variables generated from attributes $\underline{a}_{kk}^M$ via the probability density (mass) function (pdf/pmf) $p(\underline{a}_{ii}^D|\underline{a}_{kk}^M)$. Similarly, for any mapped nodes k and m of model network to nodes i and j of data network, the link attributes $\underline{a}_{ij}^D$ are random variables generated via $p(\underline{a}_{ij}^D|\underline{a}_{km}^M)$. We seek to find a mapping that maximizes the posterior probability of the mapping matrix S given the model node $A^M$ and data node $A^D$:

$$\max_S p(S|A^M, A^D). \qquad (1)$$

Posterior distribution was selected over alternative approaches because likelihood or joint distribution modeling can lead to difficulties when using the rich local features that can occur in relational data, because it requires modeling the distribution of the data, $p(A^D)$, which we cannot accurately estimate due to the variability and complexity of the data. Data distribution can include complex dependencies among relevant and irrelevant nodes (e.g., drugs trafficking interfering with local trade); modeling these dependencies can lead to intractable formulations, but ignoring them can lead to reduced performance. Instead, we directly model the conditional posterior mapping distribution, which is sufficient for classification since the mapping matrix S is what we seek to infer. Since we are conditioning on the observed data, dependencies among all of the data variables need not be explicitly represented, affording the use of rich, global features of the observations.

Following Levchuk et al. (2007) and Levchuk, Bobick, and Jones (2010), the posterior pdf can be written as $$p(S|A^M, A^D) \approx \frac{1}{Z} \prod_{ki} \{p(a_{ii}^D|a_{kk}^M)\}^{s_{ki}} \prod_{kmij} \{p(a_{ij}^D|a_{km}^M)\}^{s_{ki}s_{kj}},$$

where Z is a scaling variable independent of mapping S and where the attributes of nodes and links in the data are conditionally independent. The shape of the component pdf $p(\underline{a}_{ij}^D|\underline{a}_{km}^M)$, called feature functions, can be expressed directly by probabilistically modeling the missing data, deceptions, errors and inconsistencies in data collection, and/or other relations that may occur between model and data features. As an example, if we assume no missing data and Gaussian feature error processing, then the node and link feature functions can be expressed as multivariate Normal density function. As another example, we could make assumptions about how a certain role may be observed through the events occurring in a geographic area. In this case, we could model feature functions using naïve Bayesians, radial basis, exponential, logistic distributions, or other feature functions based on different assumptions and purposes. Making network analysis technology flexible for different pattern definitions and assumptions is a key to succeed and be useful in real-world applications.

Taking the negative log of posterior distribution and removing components independent of mapping S, we obtain the following quadratic assignment problem (QAP):

$$\min_S Q(S) = \sum_{ki} s_{ki}C_{ki} + \sum_{kmij} s_{ki}s_{mj}C_{kmij}, \qquad (2)$$

where objective function components are negative conditional log-likelihood functions $C_{ki}=-\log P(\underline{a}_{ii}^D|\underline{a}_{kk}^M)$, $C_{kmij}=-\log P(\underline{a}_{ij}^D|\underline{a}_{km}^M)$ which we call node and link mismatch parameters. General QAP is known to be NP-hard (Garey, and Johnson, 1979); we have developed several near-optimal approximate algorithms, described in detail in the next sections, to solve this problem in manageable time for hundreds to thousands of nodes.

Products of network pattern recognition: The mapping problem allows us to generate the following inference products about observed networks: detection of hidden model networks and their instances and classification of observed/data network nodes.

Detection of hidden model networks and their instances is achieved by computing a scoring function μ(M) for each model network M, where the scoring can be calculated as a model posterior probability $\mu(M)=p(A^M|A^D)$, a mapping probability $$\mu(M) = \mathrm{argmax}_S p(S|A^M, A^D),$$

or as weighted mapping score average $$\mu(M) = \sum_n w_n p(S|A^M, A^D).$$

Model networks that score above defined threshold for these scoring functions are returned as detected. Then, the subnetworks in the data are found as a collection of nodes $\{i \in V^D | \Sigma_{k \in V^M} s_{ki}=1\}$ and links $\{(i,j) \in E^D | \Sigma_{(k,m) \in E^M} s_{ki}s_{mj}=1\}$, for each mapping S with probability $p(S|A^M, A^D)$ above threshold, are called detected instances of corresponding model networks M.

Classification of observed network nodes is achieved by finding the node mapping from model network nodes to data network nodes to maximize posterior network mapping probability $$S^* = \mathrm{argmax}_S p(S|A^M, A^D).$$

The posterior network mapping probability is also the network mapping value. Multiple mappings mapping S with probability p $(S|A^M,A^D)$ above threshold are returned. Then, a classification for data node $i \in V^D$ is a vector of attributes equal to the probabilistically-weighted sum of the mapped model attributes: $\underline{a}_{ti}^C = \Sigma_s p(S|A^M, A^D) \Sigma_{k \in V^M} \underline{a}_{kk}^M s_{ki}$.

Efficient solution to network pattern recognition problem: We search for data that matches the model network templates by solving the corresponding quadratic assignment problem (QAP). General QAP is known to be NP-hard (Garey, and Johnson, 1979). The number of all possible mappings between roles and entities in the environment is huge (e.g., there are $10^{20}$ possible mappings from the model network with 10 nodes to an environment with 100 actors); therefore, optimal algorithms or heuristics derived from optimal formulations do not perform well in this domain. Several custom approximate polynomial-complexity solutions have been developed to find near-optimal mapping, including graduated assignment (Grande et al., 2008), simulated annealing (Yu et al., 2007; Han et al., 2008), and belief propagation algorithms (Levchuk, Bobick, and Jones, 2010). These algorithms currently work in manageable (seconds to few hours) time for problems of hundreds to thousands of nodes, and can be further scaled with network segmentation and hierarchical mapping enhancements.

A graduated assignment (GA) algorithm relaxes the quadratic assignment objective by approximating the 0-1 mapping matrix S with continuous matrix and adding a penalty terms to the objective function that penalizes the violations of 0-1 constraints, as well as doing Lagrangian relaxation of mapping constraints. Non-linear optimization of obtained objective function results in iterations that first update the mapping probability and then normalize this matrix to satisfy assignment constraints. Then, the mapping matrices are derived from continuous ones using multinomial distribution parameterized by a continuous approximation to assignment matrix.

A simulated annealing (SA) algorithm maintains a set of candidate mappings, and iteratively updates them, accepting the new mapping $S^{new}$ over a previous one $S^{old}$ if (a) it produces a better objective function $Q(S^{new}) < Q(S^{old})$; or (b) if the randomly generated variable is above a threshold defined using penalty on objective function increase. The mapping update is done locally by remapping best candidate nodes.

A Belief Propagation (BP) algorithm maximizes the joint node mapping probability, and is derived from max-sum algorithm for factor graphs. It obtains the posterior mapping probability ("beliefs" that model node is mapped to a data node) using updates that are similar to passing messages between the nodes in a factor graph representing the model and data networks and their component mismatches.

In the BP algorithm, we approximate marginal posterior distributions of mapping from the model nodes to data nodes $b_k(i) = P(s_{ki}|A^M, A^D)$ by passing "messages" that carry beliefs about matches of model nodes and links in the data, between variable nodes and factor nodes defined for the links in model network. Values $b_k(i)$ are then used to generate the final mapping S.

Figure 8:
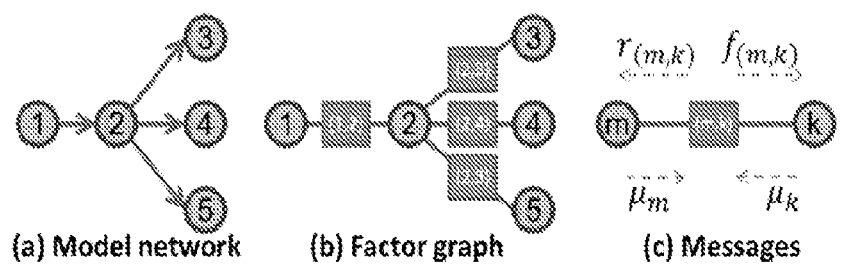
FIG. 8 is an example of factor graph construction for attributed graph matching where square boxes represent factor nodes, while round boxes correspond to the model nodes and corresponding variable nodes in factor graph.

The factor nodes and corresponding factor graph in the problem of matching model network to a data network are defined for each link in the model network, while variable nodes correspond to the model nodes with variables in those nodes correspond to assignment of data nodes to corresponding model node. For each link in the model network factor nodes are created; each factor node sends out two messages, each being an array of double variables computed iteratively. FIG. 8 shows an example of model network, corresponding factor graph, and the messages that are passed from factor nodes to update marginal posterior distribution.

The message passing is executing using the following steps. First, for each link factor we update two factor messages, representing the marginal log-probabilities of matching model link (m,k) to the data link that ends in node j, $f_{(m,k)}(j)$, or starts in node j, $r_{(m,k)}(j)$, and send them to variable nodes: $f_{(m,k)}(j) \propto \max_i(-C_{mkij} + \mu_m(i) - r_{(m,k)}(i))$, $r_{(m,k)}(j) \propto \max_i(-C_{mkji} + \mu_k(i) - f_{(m,k)}(i))$. Second, we use received messages in variable nodes to update node messages $\mu_m(i)$ that represent marginal log-posterior probability of mapping model node m to data node i:

$$\mu_m(i) \propto -C_{mi} + \sum_{l:(l,m) \in E^M} f_{(l,m)}(i) + \sum_{l:(l,m) \in E^M} r_{(m,l) \to m}(i).$$

We simplify the updates to these equations by first computing the values $\tau_{(m,k)}^r = \max_i(\mu_m(i) - r_{(m,k)}(i))$, $\tau_{(m,k)}^f = \max_i(\mu_k(i) - f_{(m,k)}(i))$ and then updating the messages as $$f_{(m,k)}(j) \propto \max \begin{cases} -C_{mk \to null} + \tau_{(m,k)}^r, \\ \max_{i:(i,j) \in E_D} (-C_{mkij} + \mu_m(i) - r_{(m,k)}(i)) \end{cases},$$

$$r_{(m,k)}(j) \propto \max \begin{cases} -C_{mk \to null} + \tau_{(m,k)}^f, \\ \max_{i:(i,j) \in E_D} (-C_{mkij} + \mu_k(i) - f_{(m,k)}(i)) \end{cases}.$$

Here, the value $C_{mk \to null}$ represents a penalty of mapping model link $(m,k) \in E_M$ to no ("null") link in the data, and can be computed using a model of missing links and link attributes.

Using these reformulations, the message passing updates take on the order of $O(\max\{|V_M|, |E_M|\} \times \max\{|V_D|, |E_D|\})$ operations. In addition, we need to either store the same amount of variables (node and link mismatches) in memory or execute remote access protocols to the data store holding these values. As the result, the computational complexity of the BP algorithm can be improved by segmenting the data network into subsets (clusters) of nodes and performing the matching in parallel against every cluster and combining the resulting variables.

To avoid convergence issues of BP, we perform incremental update, where all message updates above are executed as $v \leftarrow v^{old} + a(v^{new} - v^{old})$, where v represent the values of messages $f_{(m,k)}(j)$, $r_{(m,k)}(j)$, or $\mu_m(i)$. The convergence rate a controls the speed with which we accept the changes in the parameter values and allows avoiding the problems illustrated in the next subsection.

In the above updates, we normalize the messages to assure corresponding probabilities sum to 1: $\Sigma_{x_i} e^{l_{k \to i}(x_i)} = \Sigma_{x_i} e^{\mu_i(x_i)} = 1$. At the end of algorithm iterations, we calculate the marginal posterior distribution as $b_k(i) = e^{\mu_k(i)}$.

Computing mappings from marginal probabilities: We developed three methods to find multiple network mappings. First, we can find mappings by sampling directly over $b_k(i)$. Second, we can use the marginal posterior probabilities $b_k(i)$ obtained using BP as the assignment weights, and find the K-best assignment (Han et al., 2012) using a 2-D multi-assignment ranking strategy (Murty, 1968) and a local stochastic update. Finally, we developed a procedure for defining the mapping incrementally by selecting data node i for model node k using sorted $b_k(i)$ values, updating the mismatch coefficients, and then performing several iterations of BP on the remaining model and data nodes to update $b_k(i)$ values. The third approach, while most computationally costly, achieves the highest recall of multiple network matches in the data.

Feasibility of probabilistic pattern matching to find threat networks and detect roles of actors: In addition to the empirical results from NetSTAR experiments described in the Related Work section, our pattern matching algorithms achieved high accuracy of node-to-node mapping (>73% under SNR=8.7 dB) in several sensitivity studies and real-world applications (Levchuk et al., 2007; Grande et al., 2008; Levchuk, Lea, and Pattipati, 2008).

Algorithms to Detect Network Dynamics and Recognize State Evolution Over Time To solve the challenge of recognizing networks that change over time, we can employ Hidden Markov Model (HMM) applied to tracking the network changing over time.

HMM is a method for modeling partially observed stochastic processes and behaviors with structure in time by probabilistically inferring the true (hidden) state through another set of stochastic processes (observed adversarial network states), see for example (Singh et al., 2007; Tu et al., 2006; Pattipati et al., 2005; Chen, and Willett, 2001). HMMs are applicable to track changes in the state of model network (e.g., described in section 2.4.c.2.1.2), which can be quantitatively modeled as stochastic processes using probabilities of transition between states of the network. With this $p_{uv}^M = \Pr(A^M(v)|A^M(u))$ representation, the network behavior process assumes the form of a HMM, where hidden process $p_{uv}^M$ models the evolution of the hidden network state, and observations are generated based on missing data, irrelevant observations, and data processing errors through the observation process with probability $p_{ut}^O = \Pr(A^D(t)|A^M(u))$.

A model M of the evolving hidden network is represented by three sets of parameters $\lambda^M = \{p_{uv}^M, p_{ut}^O, p_u^M\}$, where $p_{uv}^M$ is the probability of hidden state transition dynamics, $p_{ut}^O$ is observation probability, and $p_u^M = P(A^M(u))$ is the prior probability of initial network state $A^M(u)$. Multiple such models distinguished by different sets of parameters will form the hypothesized set of the hidden network model dynamics, and we must learn which model is generating the observed data. Therefore, to reason about the changing networks, we infer from data the true network dynamics model M, and the true network state sequence $A^M(\mu_t)$, t=1, . . . , T.

Extending temporal network models in NETSTORM: Both dynamic network recognition models described above can be used in NETSTORM with modifications. HMMs are simpler models than graph-theoretic approaches but have the benefit of extracting multiple active patterns (e.g., needed when there are several changing networks hidden in the data). Both models will be modified in NETSTORM by integrating data association (mapping between nodes of model and data networks) into the solution to achieve iterative maximization of the posterior joint probability distribution function (pdf) of model network state and node-to-node mapping. While both the HMM and factor graph model developed by Prof. Carley are based on maximizing likelihood of the model pattern, using posterior estimation is more appropriate for reasoning over large networks that are partially generated by multiple known and unknown patterns (benefits of modeling using posterior rather than likelihood have been described in previous section).

To find the mapping matrix S for multi-time observations of the network state, we treat true network state sequences as missing variables and apply the EM algorithm. This approach results in an iterative update of S that minimizes the quadratic assignment problem structurally similar to (1) but with different mismatch parameters, computed as expected node-link mismatch. In the Phase I of NETSTORM, we implement the modified HMM and factor graph algorithms that iteratively update network node mapping and corresponding posterior estimates. To find a solution, we use a min-sum version of belief propagation algorithm (Bayati, Shah and Sharma, 2006) by incorporating organizational, temporal, spatial, and influence relations and network state dependencies factors. This formulation can be parallelized by distributing the message updates, thus producing an efficient and scalable multi-threaded search algorithm to handle large graph searches in real time.

Using enhanced temporal network models, we address three main challenges of detecting dynamic networks:

Network dynamics detection: Given sequence of observations (data network states), we need to find a model network pattern that might be present. This will be achieved by maximizing the posterior probability $P(\lambda^M|A^D)$ over models $\lambda^M = \{p_{uv}^M, p_{ut}^O, p_u^M\}$ conditioned on observed data sequence $A^D = \{A^D(1), \ldots, A(T)^D\}$, and can be obtained using a modified dynamic programming forward/backward algorithm or belief propagation algorithm.

Network evolution recognition: We need to find the sequence of (hidden) model network states for a specific network model dynamics that most likely generated the obtained sequence of observations. One example of the solution is finding the sequence of hidden model network states $A^M(u_t)$, t=1, . . . , T that maximizes the probability $P(A^M(u_t), t=1, \ldots, T|A^D(1), \ldots, A(T)^D, \lambda^M)$ using the Viterbi algorithm.

Network learning: We need to find parameters $\lambda^M = \{p_{uv}^M, p_{ut}^O, p_u^M\}$ for the model that match available examples of data network state. This problem can be perceived as one of training the model on a set of inputs. The solution is obtained by applying extended expectation-maximization (EM) algorithm.

Model Network Learning Algorithms

When model networks are difficult to define manually, machine learning techniques are used to learn attributes and parameters from historic observations of networks. Network state attributes can be learned iteratively in unsupervised manner from a set of historic observations of network states D(t), t=1, . . . , N, called network corpus, with attributes $A^D(t)$ (defined via attribute matrix $[a_{ij}^D(t)]$) for times t=1, . . . , T. For a single network state learning, we can maximize model network posterior probability:

$$A^M = \underset{A}{\arg\max}\, P(A|A^D(t)) \qquad (3)$$

To compute this objective function, we either need knowledge of network mapping, or need to perform marginalization. The main idea is to use EM that will treat mapping matrices as hidden variables to find iterative parameters $A^M[n]$. EM iteratively improves initial estimate $A^M[0]$ and generates estimates $$A^M[n+1] = \underset{A^M}{\arg\max}\, Q_n(A^M),$$

where $$Q_n(A^M) = E_{S|A^D, A^M[n]} \left[ \sum_t \log P(S(t)|A^M, A^D(t)) \right]. \quad (4)$$

and expectation is over mapping conditional distribution $p(S(t)|A^D(t), A^M[n])$.

In case of Gaussian observation process, this results in the minimization of the quadratic function $$\min_{A^M} \sum_t \sum_{ki} \alpha_{ki}(n,t) \|a_{kk}^M - a_{ii}^D(t)\| + \sum_{kmij} \alpha_{kmij}(n,t) \|a_{km}^M - a_{ij}^D(t)\|, \quad (5)$$

where the coefficients $\alpha_{ki}(n,t)$, $\alpha_{kmij}(n,t)$ are computed (E-step of EM algorithm) as mapping probabilities conditioned on the observed data examples. This approach results in computation of model network attributes (M-step) as weighted sums of data attributes:

$$a_{kk}^M(n+1) \leftarrow \frac{\sum_t \sum_i \alpha_{ki}(n,t) a_{ii}^D(t)}{\sum_t \sum_i \alpha_{ki}(n,t)} \quad (6)$$

$$a_{km}^M(n+1) \leftarrow \frac{\sum_t \sum_i \alpha_{kmij}(n,t) a_{ij}^D(t)}{\sum_t \sum_{ij} \alpha_{kmij}(n,t)}$$

Then EM proceeds by iteratively computing weights and attributes.

The main complexity improvement can be achieved in E-step to avoid computation of exact mapping probability distribution. We thus propose three approaches to modify EM algorithm to reduce complexity of the solution. First, we can use mismatch coefficients and soft-assignment method to generate weight coefficients. Second, we can obtain multiple samples (e.g., best-K assignments or multivariate samples using distributions) for matrix S(t) that maps model network $A^M[n]$ to data network $A^D(t)$ and use those to approximate (weight coefficients). The third alternative is to use matches between data networks to find non-iterative approximations to the weight coefficients.

Generation of network corpus: Network corpus, a collection of data networks which are instances of the same pattern, are obtained in either supervised manner as a set of annotated networks, or in unsupervised manner. In unsupervised situations, we developed two approaches to construct multiple corpuses serving as candidates for the patterns. In this situation, we are given a single large data network D with attributes $A^D$. We then segment this network into subnetworks for the training corpus using one of the following approaches. First, many large data networks contain disconnected subnetworks, which are natural candidates for the inclusion in training corpus. Second, the observations can often be segmented in time and space, thus providing us with subnetworks to generate training network corpus. Finally, we developed an algorithm to perform data segmentation using mapping of structural primitives. This approach is based on a generative model of the network formation, which assumes that structurally there is a limited set of primitive (or elementary) subnetworks that could occur in the data. We then generate a training network corpus by finding matches of primitive network elements in the data network (using only structural attribute information) and using the examples of structural primitives to learn the patterns in unsupervised manner. This approach is useful when we do not know the attributes of the networks but can hypothesize the structure of dependencies between the entities. The learned patterns are then selected which have a large set of instances (size of the network corpus) and small variation within the instances (within the corpus).

The network state evolution parameters $\{p_{uv}^M, p_{ut}^O, p_u^M\}$ used by HMM model to track the state of a network can be learned from historic data using a modified Baum-Welch algorithm, in which we must account for actor-node mapping between nodes of observed and model networks.

Other Example Embodiments of Methods for Network Pattern Matching

Scalability Enhancements for Managing Large Datasets:
Finding the mapping directly using QAP formulation to a network with millions of nodes is not tractable. The main complexity of the mapping solution is in the total number of node-to-node mapping alternatives, which, in general, for every model node is equal to the number of nodes in the data network, resulting in the total number of feasible mappings $O(m^n)$, where m is the number of model nodes and n is the number of data nodes. Therefore, to scale-up for large data size, we can implement the following modifications to network classification algorithms that will constrain the number of mapping alternatives:

Track a subset of data nodes: We may maintain a small list of often updated "active" data nodes and perform iterative node mapping and hypotheses scoring calculations for this set.

Perform network clustering for segmentation: We may segment the large data network into a set of smaller sub-networks based on the multiple attributes of nodes and links. The subnetworks will then become candidates for mapping if a high-level approximate network similarity metric is above threshold.

Perform network clustering for hierarchical mapping: After networks are segmented into smaller separable sub-networks, each of the subnetwork matching activities could be performed in parallel, and each can be further scaled down by clustering similar nodes together. We may use attributes of the data and model networks to cluster nodes into groups and then perform hierarchical mapping. Network nodal clustering algorithms lay the foundation for both segmentation and hierarchical mapping enhancements of NETSTORM.

Define high-level node mapping constraints: We may use thresholds on the allowable mismatch between observed actors and nodes in model networks, as well as among their links, to reduce the number of explored feasible node-to-node mapping.

Large matrix reductions, needed for example during the graduated assignment algorithm, can be performed using sparse matrix representations. Combining this with high-level node mapping constraints can result in significant improvements on the memory allocation and number of operations at each iteration step in mapping search algorithm.

Figure 9:
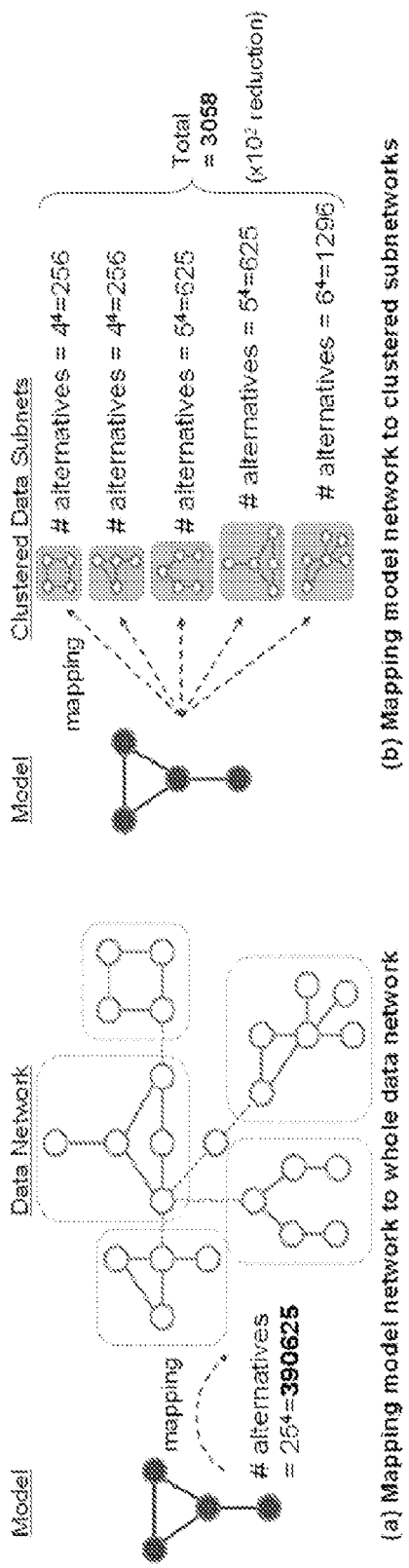
FIGS. 9a and 9b is a graphical representation of some of the network segmentation benefits of clustering in one embodiment of a network pattern recognition system.

Benefits of network segmentation: FIG. 9a shows an example of model (4 nodes) and data (25 nodes) networks. The total unconstrained number of mappings is $25^4$. However, it might be easy to segment the data network into several subnetworks based on removal of cutsets (sets of links that break the network into disconnected subnetworks) that have high mismatch with the model network and therefore are highly unlikely to be mapped to model network links. FIG. 9b illustrates how the number of alternative mappings could be reduced if the model network was mapped to subnetworks of the data providing a $10^2$ times reduction in the number of mappings.

Figure 10:
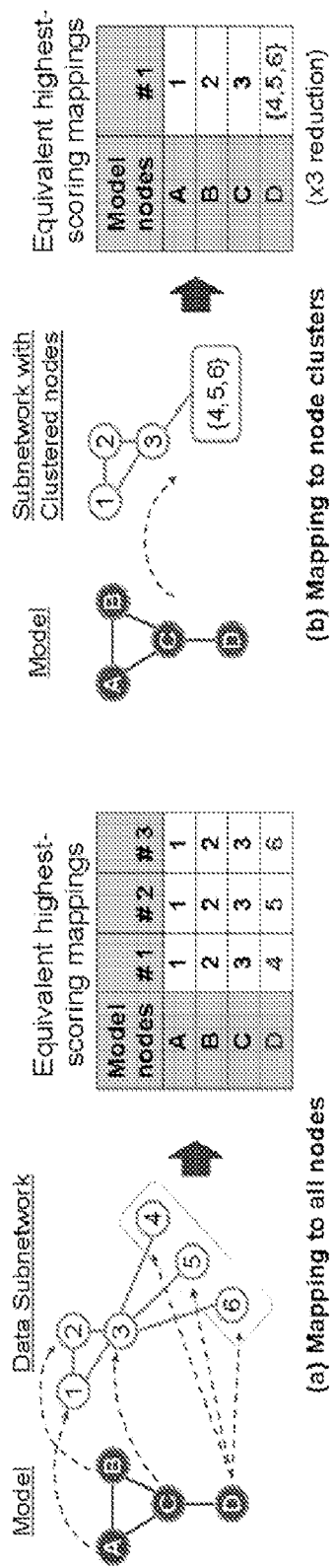
FIG. 10 is a graphical representation of some of the hierarchical mapping benefits of clustering in one embodiment of a network pattern recognition system.

Benefits of hierarchical mapping: FIG. 10a shows the mappings for one of subnetworks, where for optimally scoring mapping the model nodes A,B,C are uniquely mapped to data nodes 1,2,3 respectively, while there are three equivalent alternatives for mapping model node D to data nodes 4,5, or 6. As the result, three equivalent optimal mappings exist, thus the algorithm might either terminate by finding only one of them, or need to search further to obtain all optimal mappings. Instead, if nodes 4, 5 and 6 are clustered into a single higher-level data node, then there exists only a single optimal mapping solution, in which model node D is mapped to data node cluster {4,5,6} (FIG. 10b). Thus, clustering effectively encodes all possible alternatives (and therefore will result in higher recall rates). In this example, clustering for hierarchical mapping provides ×3 reduction in the number of alternative mappings that need to be found.

Figure 11:
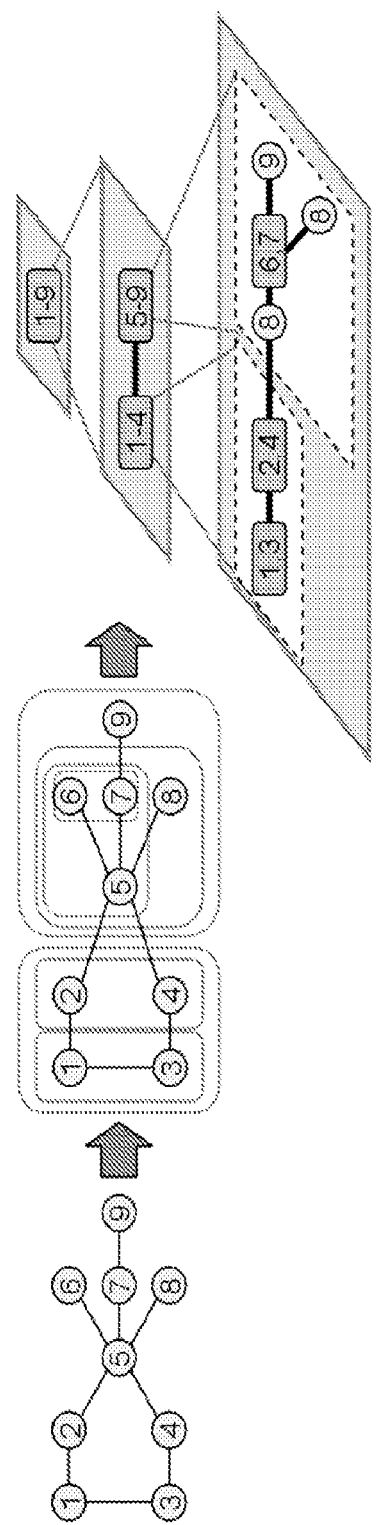
FIG. 11 is a graphical illustration of one example of clustering and corresponding hierarchical network representation.

Hierarchical network mapping: Network clustering results in multi-level hierarchical network representation, in which the nodes at lower levels are "part of" higher-level nodes. In this case, higher-level nodes may have their own independent features as well as features that are summaries of the nodes in the lower levels. FIG. 11 illustrates an example of producing hierarchical network representation using clustering results.

Network clustering objectives and needs for information encoding are different for segmentation and hierarchical mapping:

The segmentation clustering needs to find clusters that are have large dissimilarity. Attribute information does not have to be encoded.

The hierarchical mapping requires clustering of nodes that are similar (in terms of their attributes and relations to other nodes). Attributes must be aggregated during clustering.

A model node corresponding to a role or activity of interest is mapped to nodes in the data network hierarchy at the currently allowed hierarchy level, proceeding in breadth-first manner based on the attribute score such mapping adds to the whole network matching score Q(S). During iterative mapping algorithm (e.g., graduated assignment), we allow remapping of the actor nodes to only a subset of nodes that are either on the same level with current mapping or one level above. A decision to go one level down or not depends on the variance of the clustered node's attributes:

If variance of attributes for lower-level nodes is low, it means that those nodes are similar and considering them individually is ambiguous and might reduce recall rate. As the result, the mapping does not advance to lower-level.

If variance of attributes is high, it means that there are candidates at the lower-level that are a better match to the model node while other candidates should be removed from consideration to improve precision rate. We then proceed to explore the lower-level nodes of the cluster, performing remapping locally.

This method enables us to achieve the complexity of classifying networks of millions of nodes that is similar to direct mapping algorithm for data networks of few thousands of nodes.

Network clustering algorithms: Several clustering models can be used for our purposes, including: (1) geo-spatial and/or contextual clustering (for network segmentation when the at-risk network is constrained by a small geographic region or particular context); (2) relational clustering (for network segmentation when dataset can be clearly decomposed into the subsets that are almost disjoint from each other according to the relationships in the at-risk network), (3) similarity-based clustering (for hierarchical network mapping when we expect to have missing observations and nodes with similar attributes); and (4) disconnected network clustering. For our purposes, we use standard incremental clustering algorithms to aggregate nodes in the data network.

Extending clustering algorithms: The standard clustering algorithms have been extended in NETSTORM to networks with multiple attributes by combining the following three approaches:

Single-dimensional attribute aggregation: Multiple attributes were aggregated into a single weight based on rule encoding relations between multiple network properties, similarly to how probabilistic network mapping in equation (2) aggregates multiple attributes into one-dimensional mismatch coefficients to reduce a multi-attribute network to a one-dimensional network and enables utilization of our already developed and validated clustering algorithms.

Multi-dimensional attribute aggregation: Attributes were subdivided into various classes based on their contextual meaning, impact on the inference, as well as organized according to the time scale evolution. This information is used to create an ordering among attribute classes, implicitly inducing a clustering of the attributes and thus of the underlying graph.

Distributed clustering and cluster fusion: The clustering was carried out for each attribute and clusters fused at the end of the procedure. This approach is beneficial because resulting clusters are meaningful for individual attribute types.

Additional Embodiment, Data Collection Planning

Based on the results of its network recognition algorithms, NETSTORM will be able to make suggestions about data collection planning. In this section, we describe models of NETSTORM used in prioritizing collection requirements and updating current predictions. First we introduce the Guided Collection Planning model, starting with planning process steps and an example, and finalizing with the details of planning algorithm.

Guided Collection Planning Algorithm: Network classification algorithms can return multiple patterns and their mappings as alternative predictions. The scoring of these alternatives will be close if there are large data gaps; as identified in program challenges the collection needs must be prioritized to guide teams to collect more relevant information. Since the patterns matched to the data are defined through attributes, we can find attributes that have not been collected yet that could disambiguate among current prediction alternatives. This identification of key attributes is based on maximizing the information gain which can gauge the "amount of disambiguation" that a collected variable may provide. The attributes get translated into questions to be asked during collection process, the entities (people, places) about which the questions are to be asked, and the potential information sources. The outcomes of one question-answer session then lead to selecting the next questions, thus resulting in the adaptive collection plan.

For each data node and link, we define a set of prediction states using a pair of model network and its mapping (M, S). The attributes of prediction states are defined by aggregating mapped model network attributes:

$$a_i^P(M, S) = \sum_k a_{kk}^M s_{ki}, a_{ij}^P(M, S) = \sum_{km} a_{km}^M s_{ki} s_{mj}$$

creating a matrix of features from which key attributes for collection can be extracted. The collection plan (steps 1-7) will consist of collection questions that can best disambiguate predicted states and corresponding model network pattern and mapping pair (M,S). We define a question in the collection plan using three elements: (1) Probe node: a node in the data network about which the question will be asked; (2) Query node: a node in data network which will be used to ask a question; and (3) Query attribute: an attribute of the probe node that is missing and needs to be collected. This attribute and its possible values will be structured in the form of a question.

Figure 12:
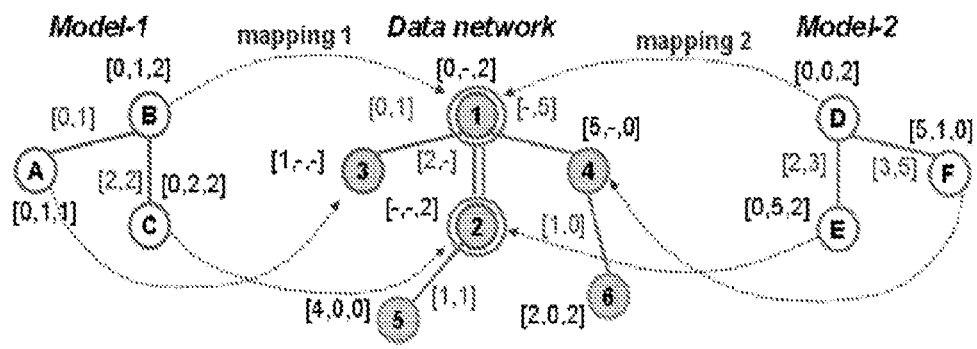
FIG. 12 is a graphical representation of one example of key attribute, probe node, and query node extraction process where a resulting query is specified by a triplet <probe node=2, query attribute=f2, query node=5>.
Figure 12:
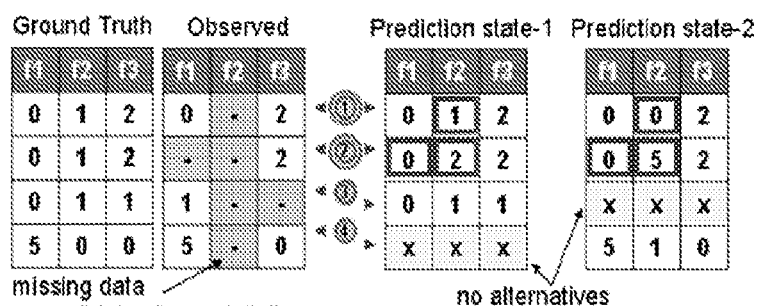
Figure 12:
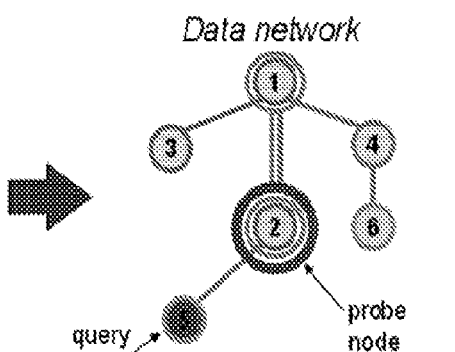

Step 1: Define prediction states for nodes and links based on network classification outcomes. Example: Based on the mapping in (FIG. 12a), the data nodes 1 and 2 have two alternative prediction states (Roles B,D and Roles C,E respectively), while nodes 3 and 4 have only one alternative (FIG. 12b).

Step 2: Remove nodes and links that have the same prediction states from consideration. Example: Nodes 1 and 2 are selected as candidate probe nodes, because they have two different prediction states.

Step 3: Select a set of missing features for each node and link that have distinct values for different prediction states. Example: For node 1 an attribute f1 is missing; for node 2 attributes f1 and f2 are missing (missing attributes shown in FIG. 12b/c as grayed-out cells or dashes in the matrix). These attributes are candidates to be query attributes.

Step 4: Compute information gain (or gain ratio) for each node, link and corresponding attribute. Example: For attribute f1 all prediction states have the value (0) so there is no disambiguation as to which mapping is better. For attribute f2 prediction states for both node 1 (1 for state 1; 0 for state 2) and node 2 (2 for state 1; 5 for state 2) are different and information gain can be computed to disambiguate between these prediction states (role mappings).

Step 5: Select a node and attribute that result in the highest information gain. This node becomes a probe node, and attribute becomes a search attribute. Example: For attribute f2 (designated as query attribute) and node 2 (designated as probe node) the information gain is highest.

Step 6: Select a node to become query node. It is either a probe node or a connected node (a specific choice will depend on the context and current predictions about probe node). Example: Node 2 is deemed inaccessible; node 5 connected to this node is designated as query node.

Step 7: Draw a diagram of feasible answers, and split the current set of prediction states into new subsets according to each feasible answer. Repeat steps 2-6 until no candidate attributes that can positively increase information gain exists. Example: The resulting collection of attribute f2 about probe node 2 querying node 5 will disambiguate completely among current two predictions.

Formal guided collection planning model: Every pattern and mapping pair creates a network prediction state with node/link attributes $A_{MS}^P = [a_{ij}^P(M,S)]$ and probability $p_{MS}$ that can be computed, for example, using conditional posterior mapping probability. For shortness of notations we write that each prediction state $n=(M,S) \in N$ (where N denotes a set of all predictions) is specified using its state attributes $x^n = \{x_1^n, \ldots, x_R^n\}$ (this vector comprises all node and link attribute vectors $a_{ij}^P(M,S)$). Without loss of generalization, assume that each feature $x_f^n$ can be collected using some action, and that the observation $y_f$ (value of this attribute) will be obtained with the probability. The actions to collect the feature information can involve posing a question about value of attribute $x_f^n$ to either corresponding data node or some other nodes connected to it.

In a guided collection planning model developed by Aptima in (Levchuk, Galster, and Pattipati, 2009), we use the entropy as a score of ambiguity of current predictions, as it characterizes "how much uncertainty is there in predicting the true state given the data already collected?", and is computed as:

$$H(N|O) = -\sum_n P_n \log p_n = -\sum_{(M,S)} p_{MS} \log p_{MS} \quad (9)$$

In the above formula, conditioning on O indicates that probabilities are based on current observations about the data. When the entropy is high, the predictions are similar. If currently predicted states carry significantly different threat meanings, then no single best actions that could be done to a node (negotiation, avoidance, etc.) could be selected with confidence. Since significant uncertainty in predictions is often due to missing data, we attempt to identify the missing features collection of which may achieve the largest reduction in the prediction's ambiguity (i.e., reduction in entropy).

First, we perform feature extraction by selecting the subset of all features f by iteratively examining prediction states of individual nodes and links. Second, we prioritize these features using a metric of expected information gain for an attribute that measures the amount of distinguishability among current predictions that collecting this feature could achieve. It is computed as a change in information entropy from prior state of predictions to a new state that would result from collecting feature f:

$$g_f = H(N|O) - H(N|O,f), \quad (10)$$

where relative aggregated entropies resulting from collection are computed as $$H(N|O, f) = -\sum_y \frac{|k \in N : \{p_f(y|x_f^k) > 0\}|}{|N|} \sum_{n \in N} p_n(y) \log p_n(y), \text{ and} \quad (11)$$

$$p_n(y) = \frac{p_f(y | x_f^n) \cdot p_n}{\sum_k p_f(y | x_f^k) \cdot p_k}.$$

The information gain is equal to the total entropy for an attribute if for each of the observed attribute values a single prediction state will remain feasible. In this case the relative entropies subtracted from the total entropy are 0. We may use information gain ratio that biases the feature extraction against considering attributes with a large number of distinct values, avoiding overfitting the model with highly attributed features.

Finally, we construct the collection plan as a conditional sequence of collection actions by defining a decision tree, where each internal node corresponds to the collection action (question), and the links out of the nodes correspond to the action outcomes (feasible answers to the question). The leaf nodes of the collection tree correspond to a belief about being in each of the states from the set of prediction states, and we can compute the probability of each of those states. Execution of the collection plan is accomplished by following the decision tree and the outcomes of the inquiries to provide decision support to patrols in terms of collection requirements and questions needed to ask.

Additional Embodiment, PDA-Based Functions

Prediction Manager and Collection Manager

The purpose of NETSTORM is to provide analysts with information on what to look for while on patrol and what data to collect—and for analysts in operations and intelligence cells with a powerful analytical tool to find the critical signals in the cacophony of normal interactions. A unit using NETSTORM in the field would start by collecting data via a personal device assistant (PDA). In actual use, the data from PDAs will be synchronized to the desktop application server, where the main analysis and prioritization modules will reside, as described above.

The PDAs will be configured with two algorithmic modules. The first module includes a predictions manager which will make updates to the local "social terrain network," providing users with real-time assessments of local networks to include threats, vulnerabilities and uncertainties. The analysis provided by the predictions manager is a geographically focused sub-set of the results generated by a more powerful desktop application of NETSTORM system. Users in operations and intelligence cells will aggregate information collected by all of the units in a large AOR to enable a wider search space.

The second module is a collection manager, which will monitor the collection plan and adapt suggestion collection actions based on newly received information from collection activities, providing the users with cues for identifying who to talk to and for engaging the people encountered. Execution of the collection plan is accomplished by following the decision tree and the outcomes of the inquiries. This addressed a critical challenge of providing decision support to patrols in terms of collection requirements and questions they need to ask. Each decision to collect the data splits the set of current hypotheses (prediction states) into several subsets (two subsets if we have binary outcomes of the collection), resulting in a reduction of the entropy. Our work on the handheld version will draw upon our experiences developing a data collection tool for social terrain (see CASMIRR, Section 2.9 Related Experience).

PDAs have limited processing due to smaller processor and battery power constraints which limit the size of networks they can process relative to desktops. To reduce the problem, the PDAs can be configured for use in specific geographic locations and for predefined tasks of their users, thus allowing them to be preloaded with just the network that corresponds with their tasking needs. NETSTORM will support this by providing the PDA with the highest scoring alternate predictions and generating new predictions on local data, but will not be able to update networks with new data. The PDA's NETSTORM software will include algorithms for disambiguation among current predictions, local network pattern search algorithms representing a light version of pattern matching, and algorithms for re-prioritization of collection needs utilizing dynamic decision tree model that will update the suggestions for probes, collection sources, and corresponding questions with new evidence (Section 2.4.c.3.1). We expect data network size preloaded to PDAs to range in the hundreds to thousands of nodes.

Figure 13:
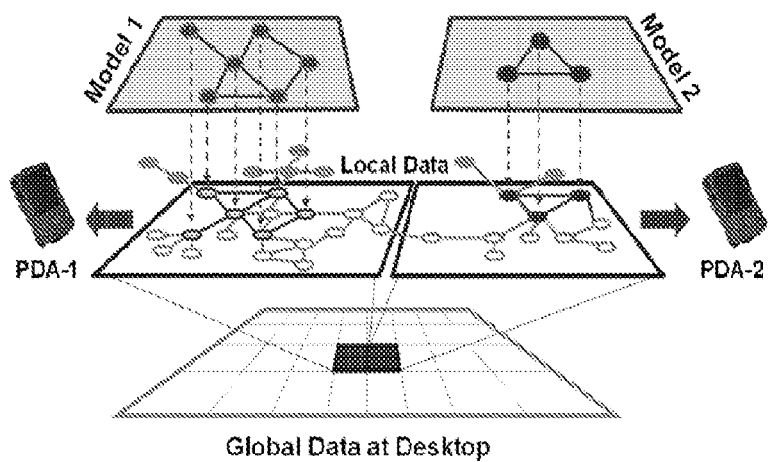
FIG. 13 is a graphical representation of an example of generating data for a Personal Digital Assistant (PDA)

FIG. 13 shows how NETSTORM data will be passed from desktop to PDA. First, we perform hierarchical clustering to aggregate the nodes into subsets relevant for each geographic area of analysis. Second, we perform network mapping and find patterns, mappings, and resulting prediction states that correspond to the local geographic area of a PDA. Finally, we load relevant prediction states to each of the PDAs.

One Example Embodiment of NETSTORM System for Network Pattern Matching

The various method embodiments of the system for network pattern matching will be generally implemented by a computer executing a sequence of program instructions for carrying out the steps of the methods, assuming all required data for processing is accessible to the computer, which sequence of program instructions may be embodied in a computer program product comprising media storing transitory and non-transitory embodiments of the program instructions.

One embodiment of the network pattern matching system generally comprises the functional elements of FIGS. 2B and 5B in a software program product to be executed by a computer implemented system.

As will be readily apparent to those skilled in the art, network pattern matching systems and methods can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 15:
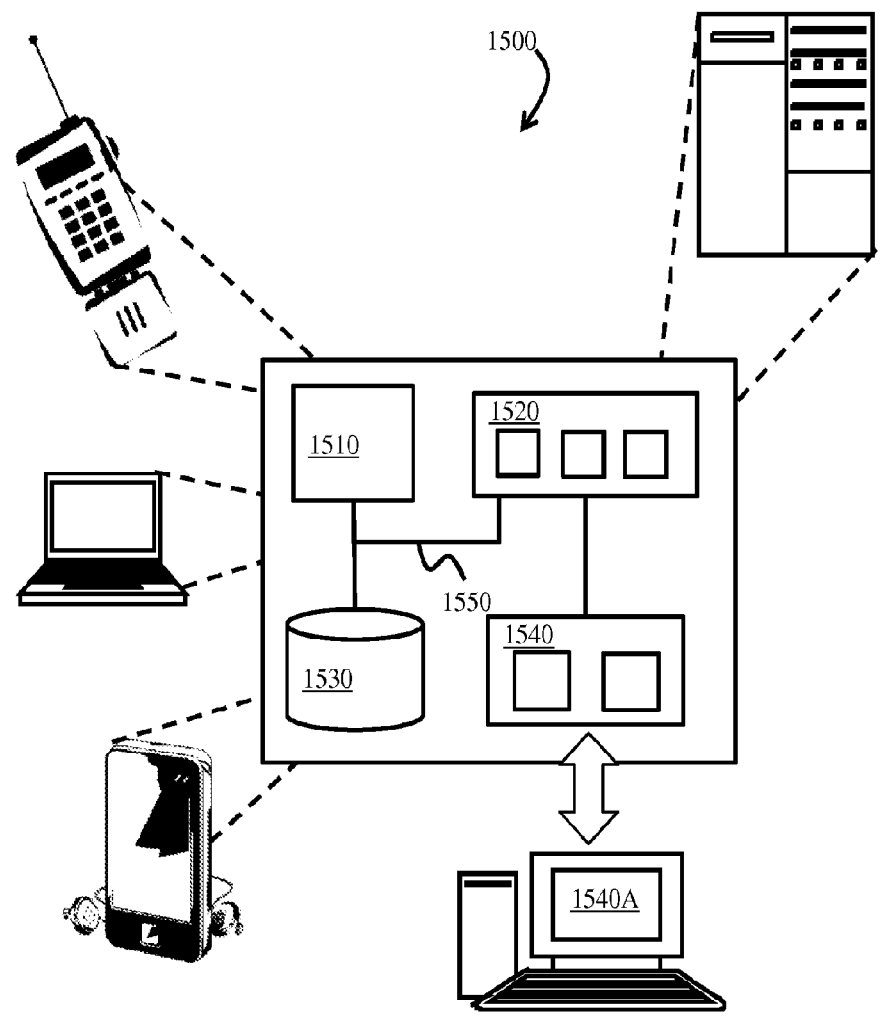
FIG. 15 is a functional diagram illustrating elements in one embodiment of a processor based system for use in one embodiment of the network pattern recognition system.

FIG. 15 is a schematic diagram of one embodiment of a computer system 1500 by which the environmental system reaction methods may be carried out. The computer system 1500 can be used for the operations described in association with any of the computer implemented methods described herein. The computer system 1500 includes at least one processor 1510, a memory 1520 and an input/output device 1540. Each of the components 1510, 1520, and 1540 are operably coupled or interconnected using a system bus 1550. The computer system 1500 may further comprise a storage device 1530 operably coupled or interconnected with the system bus 1550.

The processor 1510 is capable of receiving the instructions and/or data and processing the instructions of a computer program for execution within the computer system 1500. In some embodiments, the processor 1510 is a single-threaded processor. In some embodiments, the processor 1510 is a multi-threaded processor. The processor 1510 is capable of processing instructions of a computer stored in the memory 1520 or on the storage device 1530 to communicate information to the input/output device 1540. Suitable processors for the execution of the computer program instruction include, by way of example, both general and special purpose microprocessors, and a sole processor or one of multiple processors of any kind of computer.

The memory 1520 stores information within the computer system 1500. Memory 1520 may comprise a magnetic disk such as an internal hard disk or removable disk; a magneto-optical disk; an optical disk; or a semiconductor memory device such as PROM, EPROM, EEPROM or a flash memory device. In some embodiments, the memory 1520 comprises a transitory or non-transitory computer readable medium. In some embodiments, the memory 1520 is a volatile memory unit. In another embodiment, the memory 1520 is a non-volatile memory unit.

The processor 1510 and the memory 1520 can be supplemented by, or incorporated in, ASICs (application-specific integrated circuits).

The storage device 1530 may be capable of providing mass storage for the system 1500. In various embodiments, the storage device 1530 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 1530 comprises a transitory or non-transitory computer readable medium.

In some embodiments, the memory 1520 and/or the storage device 1530 may be located on a remote system such as a server system, coupled to the processor 1510 via a network interface, such as an Ethernet interface.

The input/output device 1540 provides input/output operations for the system 1500 and may be in communication with a user interface 1540A as shown. In one embodiment, the input/output device 1540 includes a keyboard and/or pointing device. In some embodiments, the input/output device 1540 includes a display unit for displaying graphical user interfaces or the input/output device 1540 may comprise a touchscreen. In some embodiments, the user interface 1540A comprises devices such as, but not limited to a keyboard, pointing device, display device or a touchscreen that provides a user with the ability to communicate with the input/output device 1540.

The computer system 1500 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

One embodiment of the computer program capable of executing the described methods is described below.

NETSTORM Software Architecture and Implementation

This section describes the NETSTORM computer program product architecture, which defines the structure and behavior of a system by identifying the system requirements (principles) that focus on not only system features but also system characteristics (rationales). FIG. 19 describes the architecture principles.

The primary principle is platform independence which will require that, 1) the system is developed in a language (with needed libraries) that will support all of the platforms that need to be covered and 2) interfaces need to be defined that will isolate the algorithms from the data sources and GUI. The performance and incremental processing principles imply that the system needs a high speed data store to share data between algorithms and to handle import/export of data to/from NETSTORM.

Figure 14:
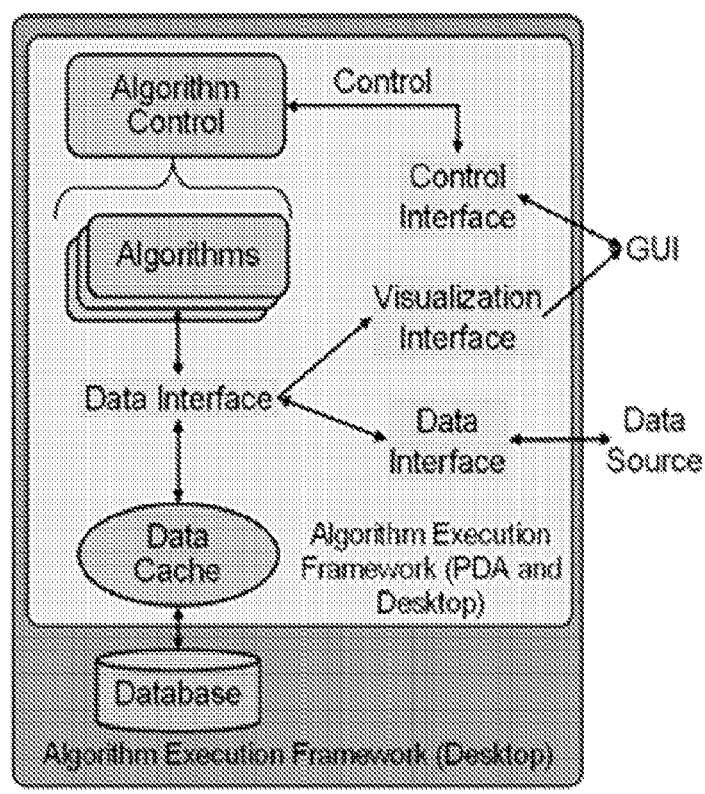
FIG. 14 is a functional diagram illustrating one embodiment of the NETSTORM algorithm execution framework.

In order to support the algorithm process that NETSTORM requires, Aptima will develop the Algorithm Execution Framework (AEF) that supports 1) the execution of the algorithms; 2) high performance interchange of data between algorithms; 3) independence between the algorithms and the graphical user interface and; 4) interface with the rest of the integration framework (see FIG. 14). The AEF will be implemented on both the PDA and Desktop platforms taking advantage of the features of each platform. The common AEF on both platforms allows algorithms to migrate from the Desktop to the PDA as the PDA hardware becomes more powerful. The NETSTORM AEF has the following main components:

Algorithm Controller: this component manages the execution of the algorithms. It takes control commands from the graphical user interface and invokes algorithms as needed.

Algorithms: these are the NETSTORM algorithms that perform the analysis of data.

Control Interface: this interface provides control inputs and outputs between the AEF and the integration framework GUI.

Visualization Interface: this interface provides for independence between the AEF and the GUI visualization implementation.

Data Import/Export: this interface provides a mechanism to import/export data between the AEF and other systems.

Data Interface: this interface provides a consistent interface to data from the algorithms.

Data Cache: the data cache component provides fast access to data and allows the algorithms to exchange data incrementally in real time.

Database: this component holds the persistent data used by NETSTORM.

This architecture is extensible and will support the future phases of NETSTORM including the ability to support intermittent network connectivity between the PDA and desktop segments. In this case, the data cache would provide the data store and keep track of new data collected as well as other data needed for analysis which can be exchanged with the desktop system when the network connectivity is available.

One example embodiment of the network pattern recognition systems and methods may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

Although this invention has been described in the above forms with a certain degree of particularity, it is understood that the foregoing is considered as illustrative only of the principles of the invention. For example, it is understood that the attributes for data nodes and data links and model links may be derived from profile information that a person, as a data node, may post to an accessible information source such as a social networking website. Additionally, model node and model link attributes may be gathered from attributes of persons, as a model node, or they may be created to match particular data node patterns.

Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A computer implemented method for determining a network pattern match, said method comprising:
   representing a plurality of data nodes and a plurality of data links of the data nodes as a data network;
   representing a plurality of model nodes and a plurality of model links of the model nodes as at least one model network;
   the plurality of data nodes and the plurality of model nodes further comprise at least one node attribute;
   at least one of the plurality of data nodes represent an entity;
   the at least one node attribute comprises at least one choice attribute representing a preference for action of the entity;
   the plurality of data links and the plurality of model links further comprise at least one link attribute;
   the at least one link attribute comprises at least one signal attribute representing a probable observed signal by a sensor;
   the data network and the at least one model network are each represented as a multi-attributed graph; and
   finding at least one match from the at least one model network to the data network utilizing a probabilistic multi-attribute graph matching analysis.

2. The computer implemented method of claim 1 wherein the probabilistic multi-attribute graph matching analysis utilizes a network clustering technique.

3. The computer implemented method of claim 1 wherein the finding at least one match from the at least one model network to the data network defines at least one attribute for at least one of the plurality of data nodes from the at least one model network.

4. The computer implemented method of claim 1 wherein:
   each data node and each model node is a multi-dimensional vector; and
   each data link and each model link is a multi-dimensional vector.

5. The computer implemented method of claim 1 wherein the probabilistic multi-attribute graph matching analysis utilizes a network clustering technique.

6. The computer implemented method of claim 1 wherein:
   the data network further comprises at least one data subnetwork; and
   finding the at least one match from the at least one model network to the data network utilizing the probabilistic multi-attribute graph analysis comprises:
      finding the at least one match from the at least one model network to the data subnetwork utilizing the probabilistic multi-attribute graph analysis.

7. The computer implemented method of claim 1 wherein:
   the data network further comprises at least one data subnetwork having at least one data subnetwork node;
   each data subnetwork node comprising data node attributes;
   each model node comprising model node attributes;
   the finding the at least one match from the at least one model network to the data network utilizing a probabilistic multi-attribute graph matching analysis comprises:
      classifying each data subnetwork node as one of a corresponding node or an irrelevant node;
      the corresponding node having a node mapping to a model node of the at least one model network;
      the irrelevant node not having a node mapping to a model node of the at least one model network;
      determining a correspondence measure for each data subnetwork representing a number of corresponding nodes;
      computing a marginal posterior probability estimate on each data subnetwork exceeding a correspondence measure threshold;
      utilizing a probabilistic multi-attribute graph matching analysis;
      classifying at least one of the data subnetwork nodes by the at least one node attribute of the corresponding node;
      determining the at least one node attribute of the corresponding node as a weighted sum of the at least one node attribute of the mapped model node of the at least one model network; and
      determining a weighted sum of weights over the attributes of mapped model nodes where the weights are computed based on marginal posterior probability estimates computed utilizing a probabilistic multi-attribute graph matching.

8. The computer implemented method of claim 1 wherein the at least one node attribute and the at least one link attribute each further comprise a statistical distribution value.

9. The computer implemented method of claim 1 wherein:
   the data node represents a person;
   the at least one node attribute represents a preference for action of the person;
   the data link represents a probable observed signal of the person; and
   finding the at least one match from the at least one model network to the data network infers at least one attribute for the data node from the at least one model network.

10. The computer implemented method of claim 9 wherein:
   the preference for action of the person is a profile attribute of the person from a social networking website; and the probable observed signal of the person is a communication with another person.

11. The computer implemented method of claim 1 wherein:
at least one of the data nodes represents a person; and
the at least one node attribute represents a preference for action of the person.

12. The computer implemented method of claim 1 wherein the data network and the at least one model network each comprise a multi-node network.

13. The computer implemented method of claim 1 further comprising:
determining a prioritized data collection plan for the data network based on the at least one match;
the data collection plan defines a query attribute of at least one of the data nodes of the data network;
communicating the prioritized data collection plan to a remote device;
receiving a value of the query attribute at the remote device;
updating the data network with the value of the query attribute;
wherein the sensor comprises an unmanned vehicle;
wherein the data node represents a person; and
wherein the data link represents an observed signal of the person.

14. The computer implemented method of claim 1 wherein the plurality of data nodes and the plurality of data links of the data nodes represent a plurality of user profile attributes of a user of a social network.

15. A computer implemented method for determining a network pattern match, said method comprising:
representing a plurality of data nodes and a plurality of data links of the data nodes as a data network;
representing a plurality of model nodes and a plurality of model links of the model nodes as at least one model network;
the plurality of data nodes and the plurality of model nodes further comprise at least one node attribute;
the plurality of data links and the plurality of model links further comprise at least one link attribute;
at least one of the plurality of data nodes represent an entity;
the at least one node attribute comprises at least one choice attribute representing a preference for action of the entity;
the at least one link attribute comprises at least one signal attribute representing a probable observed signal by a sensor;
the data network and the at least one model network are each represented as a multi-attributed graph;
finding at least one match from the at least one model network to the data network utilizing a probabilistic multi-attribute graph matching analysis; and
wherein the finding of at least one match from at least one model network to the data network utilizing a probabilistic multi-attribute graph matching analysis comprises:
defining a network mapping as a binary matrix of a plurality of node mappings between a plurality of model nodes in the at least one model network and a plurality of data nodes in the data network;
defining a network mapping value as a posterior probability of the network mapping;
utilizing a belief propagation algorithm to approximate a distribution of the network mapping values; and
determining the at least one match as the network mapping with the network mapping value which exceeds a network mapping value threshold.

16. The computer implemented method of claim 15 wherein the node mapping is determined by a probability of at least one match between the at least one data node attribute and the at least one model node attribute.

17. The computer implemented method of claim 15 wherein the utilizing a belief propagation algorithm to approximate a distribution of the network mapping values comprises:
determining a marginal posterior probability of one of the plurality of node mappings between one of the plurality of model nodes and one of the plurality of data nodes; and
utilizing statistical sampling over the marginal posterior probability to determine the network mapping value.

18. The computer implemented method of claim 15 wherein:
the data network further comprises at least one data subnetwork having at least one data subnetwork node; and
utilizing a belief propagation algorithm to approximate a distribution of the network mapping values comprises:
classifying each data subnetwork node as one of a corresponding node or an irrelevant node;
the corresponding node having a node mapping to a model node of the at least one model network;
the irrelevant node not having a node mapping to a model node of the at least one model network;
determining a correspondence value for each data subnetwork representing a value of the node mapping for the corresponding nodes;
determining a marginal posterior probabilities of one of the plurality of node mappings between one of the plurality of model nodes and each of the corresponding nodes for each data subnetwork exceeding the correspondence value; and
utilizing statistical sampling over the marginal posterior probabilities to approximate the distribution of the network mapping values.

19. A computer implemented method for determining a network pattern match, said method comprising:
representing a plurality of data nodes and a plurality of data links of the data nodes as a data network;
representing a plurality of model nodes and a plurality of model links of the model nodes as at least one model network;
the plurality of data nodes and the plurality of model nodes further comprise at least one node attribute;
the at least one node attribute comprises at least one choice attribute representing a preference for action of an entity;
the plurality of data links and the plurality of model links further comprise at least one link attribute;
the at least one link attribute comprises at least one signal attribute representing a probable observed signal by a sensor;
the data network and the at least one model network are each represented as a multi-attributed graph;
finding at least one match from the at least one model network to the data network utilizing a probabilistic multi-attribute graph matching analysis; and
wherein at least one of the plurality of model links further comprises at least one dependency between one of the plurality of model nodes and another of the plurality of model nodes.

20. A network pattern matching system for determining a network pattern match, the network pattern matching system comprising:
- a processor; and
- a non-transitory computer readable medium having a computer readable program code embodied therein, said computer readable program code configured to be executed to implement a method comprising:
  - representing a plurality of data nodes and a plurality of data links of the data nodes as a data network;
  - representing a plurality of model nodes and a plurality of model links of the model nodes as at least one model network;
  - the plurality of data nodes and the plurality of model nodes further comprise at least one node attribute;
  - at least one of the plurality of data nodes represent an entity;
  - the at least one node attribute comprises at least one choice attribute representing a preference for action of the entity;
  - the plurality of data links and the plurality of model links further comprise at least one link attribute;
  - the at least one link attribute comprises at least one signal attribute representing a probable observed signal by a sensor;
  - the data network and the at least one model network are each represented as a multi-attributed graph; and
  - finding at least one match from the at least one model network to the data network utilizing a probabilistic multi-attribute graph matching analysis.

* * * * *